US 12,409,760 B2

(12) United States Patent
McLaughlin et al.

(10) Patent No.: US 12,409,760 B2
(45) Date of Patent: Sep. 9, 2025

(54) SEAT SWIVEL ASSEMBLY WITH LOCKING PIN

(71) Applicant: Fisher & Company, Incorporated, St. Clair Shores, MI (US)

(72) Inventors: Matthew McLaughlin, St. Clair Shores, MI (US); Sapan M. Poptani, Northville, MI (US); Mircea Napau, Sterling Heights, MI (US); Ryan Martin, Macomb, MI (US)

(73) Assignee: Fisher & Company, Incorporated, St. Clair Shores, MI (US)

( * ) Notice: Subject to any disclaimer, the term of this patent is extended or adjusted under 35 U.S.C. 154(b) by 87 days.

(21) Appl. No.: 18/118,820

(22) Filed: Mar. 8, 2023

(65) Prior Publication Data

US 2023/0286419 A1 Sep. 14, 2023

Related U.S. Application Data

(60) Provisional application No. 63/404,627, filed on Sep. 8, 2022, provisional application No. 63/269,084, filed on Mar. 9, 2022.

(51) Int. Cl.
*B60N 2/14* (2006.01)
*B60N 2/02* (2006.01)

(52) U.S. Cl.
CPC ......... *B60N 2/146* (2013.01); *B60N 2/02246* (2023.08)

(58) Field of Classification Search
CPC ............................ B60N 2/146; B60N 2/02246
See application file for complete search history.

(56) References Cited

U.S. PATENT DOCUMENTS 4,436,270 A * 3/1984 Muraishi ................ B60N 2/146
248/416
4,792,188 A * 12/1988 Kawashima ........... B60N 2/146
297/344.21

(Continued)

FOREIGN PATENT DOCUMENTS

CN 210310031 U 4/2020
CN 113370855 A 9/2021

(Continued)

OTHER PUBLICATIONS

International Search Report regarding Application No. PCT/US2023/014866, mailed Jun. 29, 2023.

(Continued)

*Primary Examiner* — Philip F Gabler
(74) *Attorney, Agent, or Firm* — Harness, Dickey & Pierce, P.L.C.

(57) ABSTRACT

A swivel assembly is provided for moving a vehicle seat in an angular direction. The swivel assembly may include a lower plate, a rotating plate, a gear ring, a motor, and a locking pin assembly. The lower plate may be attached to a vehicle floor. The rotating plate may be attached to the vehicle seat. The gear ring may be fixedly attached to the rotating plate. The motor may be coupled to the gear ring and drive the gear ring to move in the angular direction to cause corresponding movement of the rotating plate and the vehicle seat. The locking pin assembly may include a locking pin that is movable relative to the lower plate between an unlocked position and a locked position. The locking pin may move into and out of engagement with the rotating plate to selectively restrict and allow movement of the rotating plate.

12 Claims, 22 Drawing Sheets

(56) References Cited

U.S. PATENT DOCUMENTS

| | | | |
|---|---|---|---|
| 4,846,529 A * | 7/1989 | Tulley | B60N 2/02246 |
| | | | 297/DIG. 10 |
| 5,599,065 A | 2/1997 | Gryp et al. | |
| 5,762,398 A | 6/1998 | Gonzalez et al. | |
| 8,182,016 B2 | 5/2012 | Kaip et al. | |
| 9,010,861 B2 | 4/2015 | Seibold et al. | |
| 9,849,813 B2 * | 12/2017 | Davis | B64D 11/06395 |
| 10,807,504 B2 * | 10/2020 | Line | B60N 2/0292 |
| 10,988,053 B2 * | 4/2021 | Kish | B60N 2/0256 |
| 10,988,054 B1 | 4/2021 | Sturhan et al. | |
| 11,001,169 B2 * | 5/2021 | Jang | B60N 2/02246 |
| 2001/0038223 A1 | 11/2001 | Suga et al. | |
| 2019/0160976 A1 | 5/2019 | Feng et al. | |
| 2020/0086768 A1 | 3/2020 | Line et al. | |

FOREIGN PATENT DOCUMENTS

| | | |
|---|---|---|
| DE | 102012112529 B3 | 3/2014 |
| JP | H06-67160 U | 9/1994 |
| JP | H10-086713 A | 4/1998 |

OTHER PUBLICATIONS

Office Action regarding German Patent Application No. 1120230012806, dated May 21, 2025 [machine translation].

\* cited by examiner

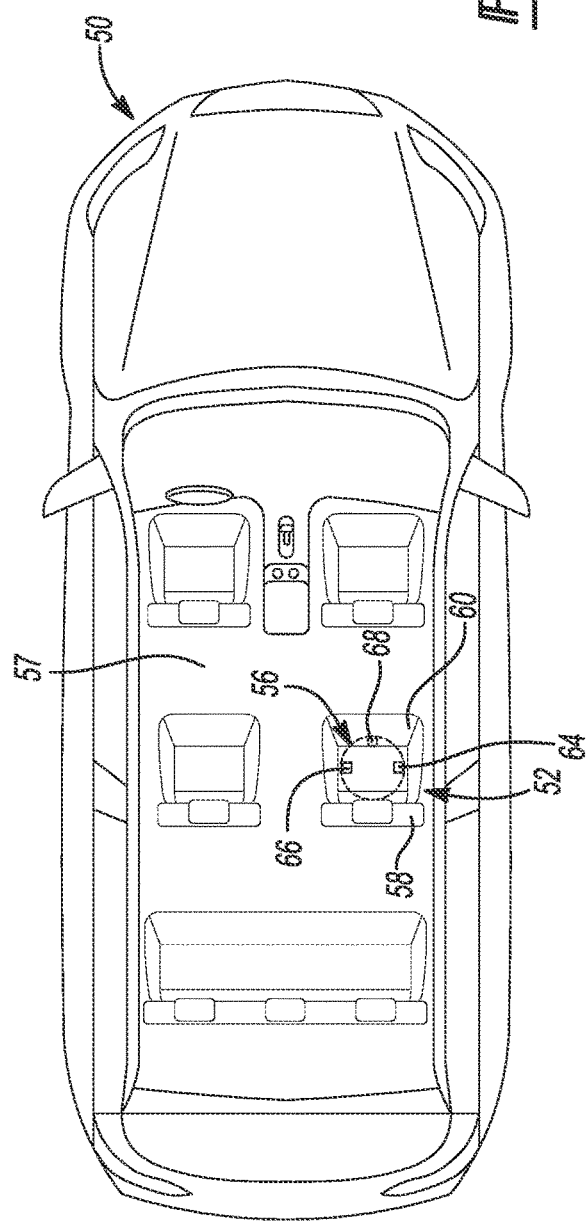
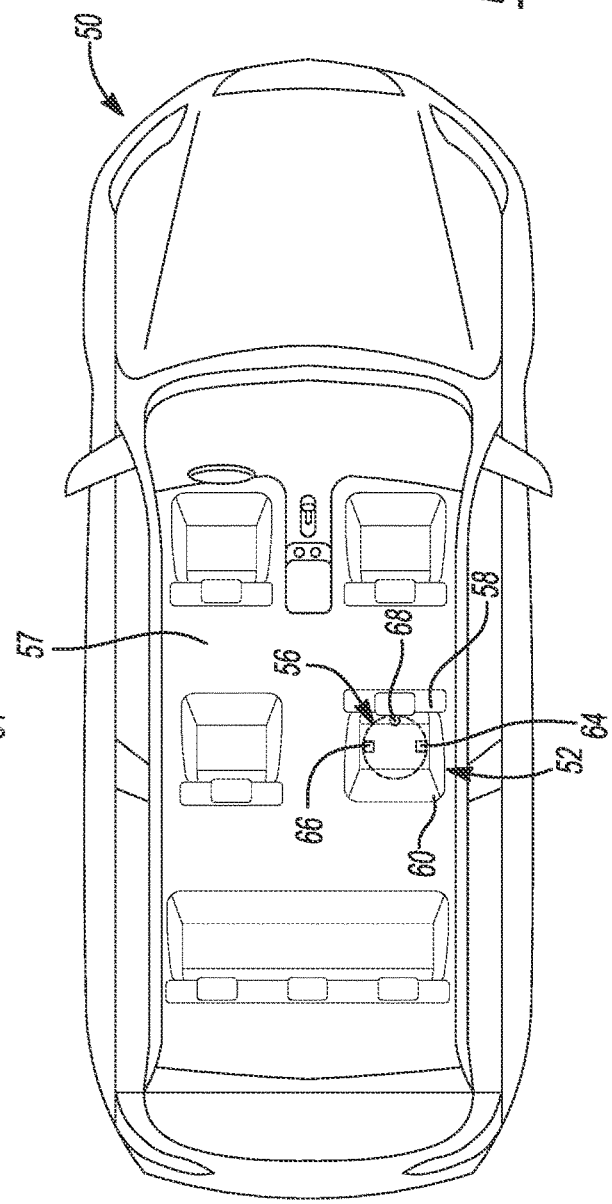

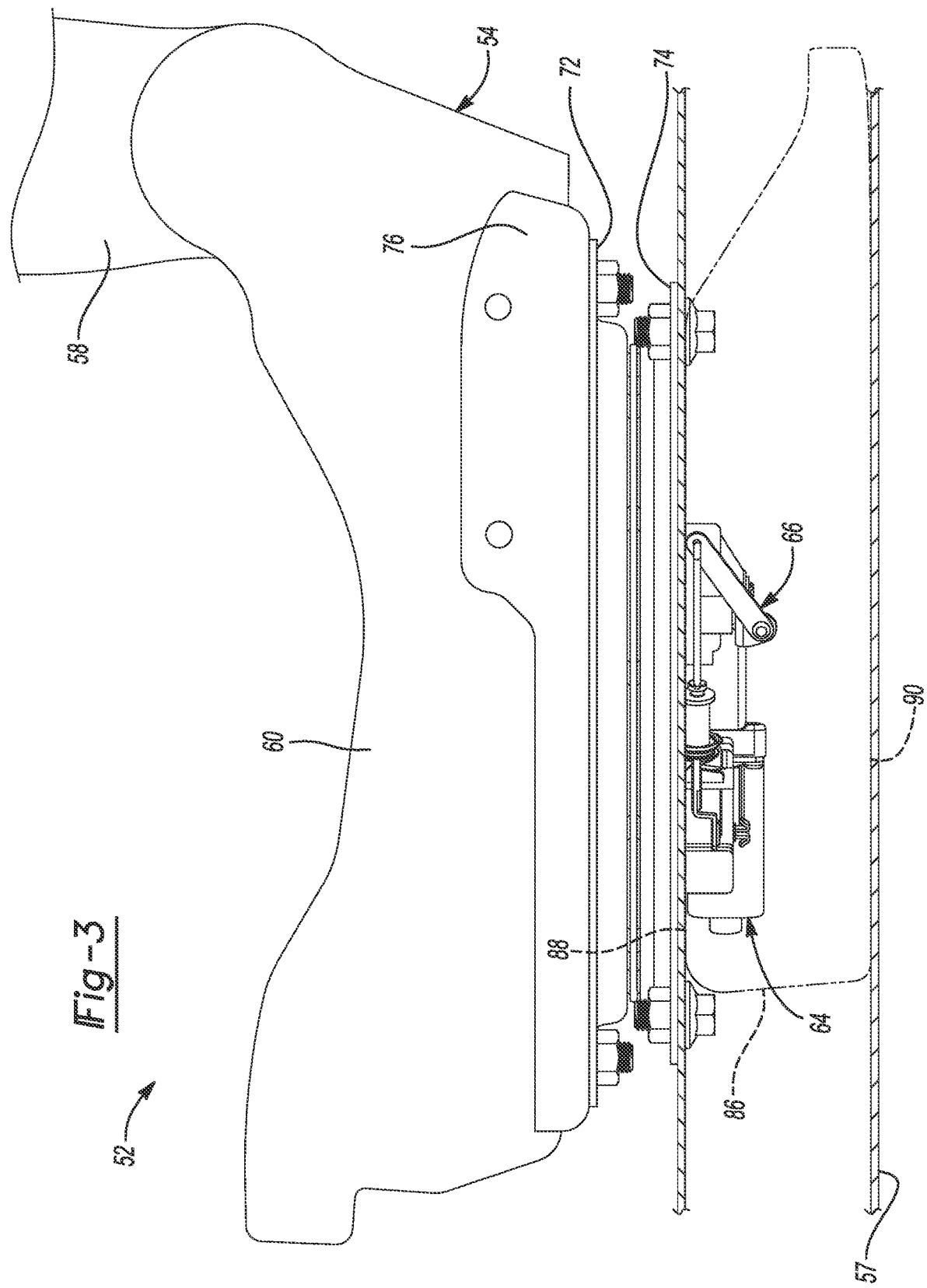

SEAT SWIVEL ASSEMBLY WITH LOCKING PIN

CROSS-REFERENCE TO RELATED APPLICATIONS

This application claims the benefit of U.S. Provisional Application No. 63/404,627, filed on Sep. 8, 2022 and U.S. Provisional Application No. 63/269,084, filed on Mar. 9, 2022. The entire disclosures of each of the above applications are incorporated herein by reference.

FIELD

The present disclosure relates to a vehicle seat assembly, and more particularly, to a seat swivel assembly with a locking pin.

BACKGROUND

This section provides background information related to the present disclosure and is not necessarily prior art.

Vehicles such as automobiles, for example, typically include at least one seat assembly that is movable in one or more directions (e.g., fore-aft, up-down, angular, etc.) relative to a floor of the vehicle. An occupant of the vehicle may adjust the seat's position to suit the occupant's preferences for comfort and/or functionality.

A seat assembly may include a swivel assembly to adjust a position of the seat assembly in an angular direction. Some swivel assemblies are complex and allow unintentional movement during a vehicle impact event and/or during the normal operation of the swivel assembly (i.e., chucking). For example, such swivel assemblies may move from a locked position to an unlocked position during a vehicle impact event, which may cause the seat to freely move in the angular direction. In another example, components of the swivel assembly may move while the vehicle is in motion, which may cause a rattling noise that is bothersome to the occupants. Identifying and restricting the unintentional movement without adversely impacting the swivel seat assemblies' intended operation has been found to be a challenge. The present disclosure provides a swivel seat assembly with a locking pin assembly that is relatively simple and reduces or eliminates unintended movement of the swivel seat assembly.

SUMMARY

This section provides a general summary of the disclosure and is not a comprehensive disclosure of its full scope or all of its features.

The present disclosure provides a swivel assembly for moving a vehicle seat in an angular direction relative to a vehicle floor between a first angular position and a second angular position. The swivel assembly may include a lower plate, a rotating plate, a gear ring, a motor, and a locking pin assembly. The lower plate may be configured to be attached to the vehicle floor. The rotating plate may be configured to be attached to the vehicle seat. The gear ring may be fixedly attached to the rotating plate. The motor may be coupled to the gear ring. The motor may drive the gear ring to move in the angular direction to cause corresponding movement of the rotating plate and the vehicle seat. The locking pin assembly may include a locking pin movable relative to the lower plate between an unlocked position and a locked position. The locking pin moves into engagement with the gear ring to restrict movement of the rotating plate in the locked position and the locking pin moves out of engagement with the gear ring to allow movement of the rotating plate in the unlocked position.

In some configurations of the swivel assembly of the above paragraph, the locking pin assembly includes an actuator that drives movement of the locking pin between the locked and unlocked positions.

In some configurations of the swivel assembly of either of the above paragraphs, the locking pin assembly includes a plunger movably received within a housing of the actuator, and a connecting link that transmits movement of the plunger to the locking pin.

In some configurations of the swivel assembly of any of the above paragraphs, the plunger translates into and out of the housing of the actuator, and movement of the plunger causes pivoting movement of the connecting link such that the locking pin is moved between the locked position and unlocked position.

In some configurations of the swivel assembly of any of the above paragraphs, the swivel assembly further includes a gear coupled to the motor and meshingly engaged with the gear ring.

In some configurations of the swivel assembly of any of the above paragraphs, the gear includes outer teeth and the gear ring includes inner teeth such that the outer teeth and the inner teeth mesh together.

In some configurations of the swivel assembly of any of the above paragraphs, the motor drives rotational movement of the gear, and movement of the gear causes corresponding and simultaneous rotation of the gear ring.

In some configurations of the swivel assembly of any of the above paragraphs, the gear ring is positioned vertically above the rotating plate.

In some configurations of the swivel assembly of any of the above paragraphs, the locking pin extends through the lower plate and at least partially through the rotating plate and the gear ring in the locked position.

The present disclosure provides a swivel assembly for moving a vehicle seat in an angular direction relative to a vehicle floor between a first angular position and a second angular position. The swivel assembly may include a lower plate, rotating plate and a locking pin assembly. The lower plate may be configured to be attached to the vehicle floor. The rotating plate may be configured to be attached to the vehicle seat. The rotating plate may be movable in the angular direction relative to the lower plate to cause corresponding movement of the vehicle seat between the first and second angular positions. The locking pin assembly may include a locking pin movable relative to the lower plate between an unlocked position and a locked position. The locking pin may extend at least partially through the rotating plate to restrict movement of the rotating plate when the locking pin is in the locked position, and the locking pin may allow movement of the rotating plate when the locking pin is in the unlocked position.

In some configurations of the swivel assembly of the above paragraph, the swivel assembly further includes a ball bearing ring positioned between the lower plate and the rotating plate.

In some configurations of the swivel assembly of either of the above paragraphs, the swivel assembly further includes an upper plate positioned vertically above the rotating plate and fixedly attached to the lower plate.

In some configurations of the swivel assembly of any of the above paragraphs, the locking pin assembly includes an actuator operable to drive movement of the locking pin between the unlocked position and the locked position.

In some configurations of the swivel assembly of any of the above paragraphs, the locking pin assembly includes a plunger movably received within a housing of the actuator and a connecting link coupled to the plunger to transmit movement of the plunger to the connecting link, wherein the connecting link is coupled to the locking pin. The plunger translates into and out of the housing of the actuator, and movement of the rod causes pivoting movement of the connecting link which causes linear movement of the locking pin between the locked position and unlocked position.

In some configurations of the swivel assembly of any of the above paragraphs, the swivel assembly further includes a gear ring fixedly attached to the rotating plate.

In some configurations of the swivel assembly of any of the above paragraphs, the gear ring includes a plurality of inner teeth.

In some configurations of the swivel assembly of any of the above paragraphs, the swivel assembly further includes a gear having outer teeth and the outer teeth of the gear meshes with the inner teeth of the gear ring.

In some configurations of the swivel assembly of any of the above paragraphs, the swivel assembly further includes a motor operable to rotate the gear and movement of the gear drives movement of the gear ring in the angular direction.

In some configurations of the swivel assembly of any of the above paragraphs, the gear ring includes a plurality of slots spaced angularly apart from each other.

In some configurations of the swivel assembly of any of the above paragraphs, the locking pin moves into one of the slots of the gear ring to restrict movement of the rotating plate and the locking pin moves out of the slots to allow movement of the rotating plate.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations and are not intended to limit the scope of the present disclosure.

FIG. 1 is a top view of a vehicle with a seat assembly in a first angular position according to the principles of the present disclosure;

FIG. 2 is a top view of the vehicle with the seat assembly of FIG. 1 in a second angular position;

FIG. 3 is a side view of a swivel assembly of the seat assembly of FIG. 1;

Corresponding reference numerals indicate corresponding parts throughout the several views of the drawings.

DETAILED DESCRIPTION

Figure 4:
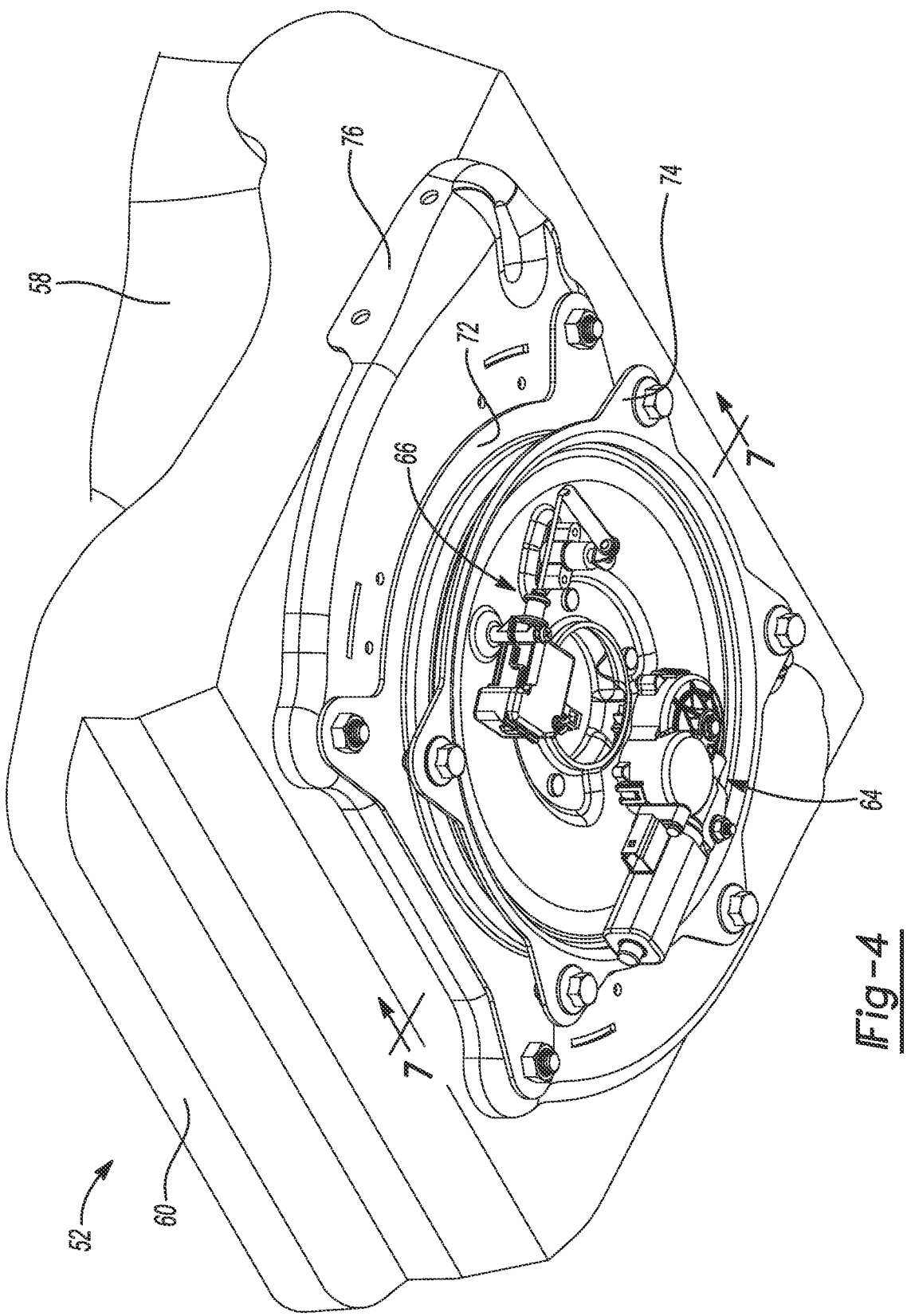
FIG. 4 is a perspective view of the swivel assembly in the first angular position.

Example embodiments will now be described more fully with reference to the accompanying drawings.

Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIGS. 1-18, a vehicle 50 is provided with a seat assembly 52. The seat assembly 52 may include a seat 54 and a swivel assembly 56. The swivel assembly 56 may move the seat 54 relative to a floor 57 of the vehicle 50. More specifically, the swivel assembly 56 may move the seat 54 relative to the floor 57 in an angular direction (e.g., a rotary direction) between a first angular position (FIG. 1) and a second angular position (FIG. 2). For example, the seat 54 may rotate 180 degrees in a clockwise and/or counter-clockwise direction from the first angular position to the second angular position and vice versa. Furthermore, the swivel assembly 56 may be capable of rotating the seat 54 360 degrees in the clockwise and/or counter-clockwise direction. In some configurations, the seat 54 may be movable to additional angular positions between the first and second angular positions.

The seat 54 includes a seatback 58 and a seat bottom 60. The seatback 58 may be movable relative to the seat bottom 60 (e.g., between reclined and upright positions via a recliner assembly; not shown) and the seat bottom 60 may be movable relative to the floor 57 of the vehicle 50 (e.g., via a fore-aft adjustment assembly; not shown).

Figure 5:
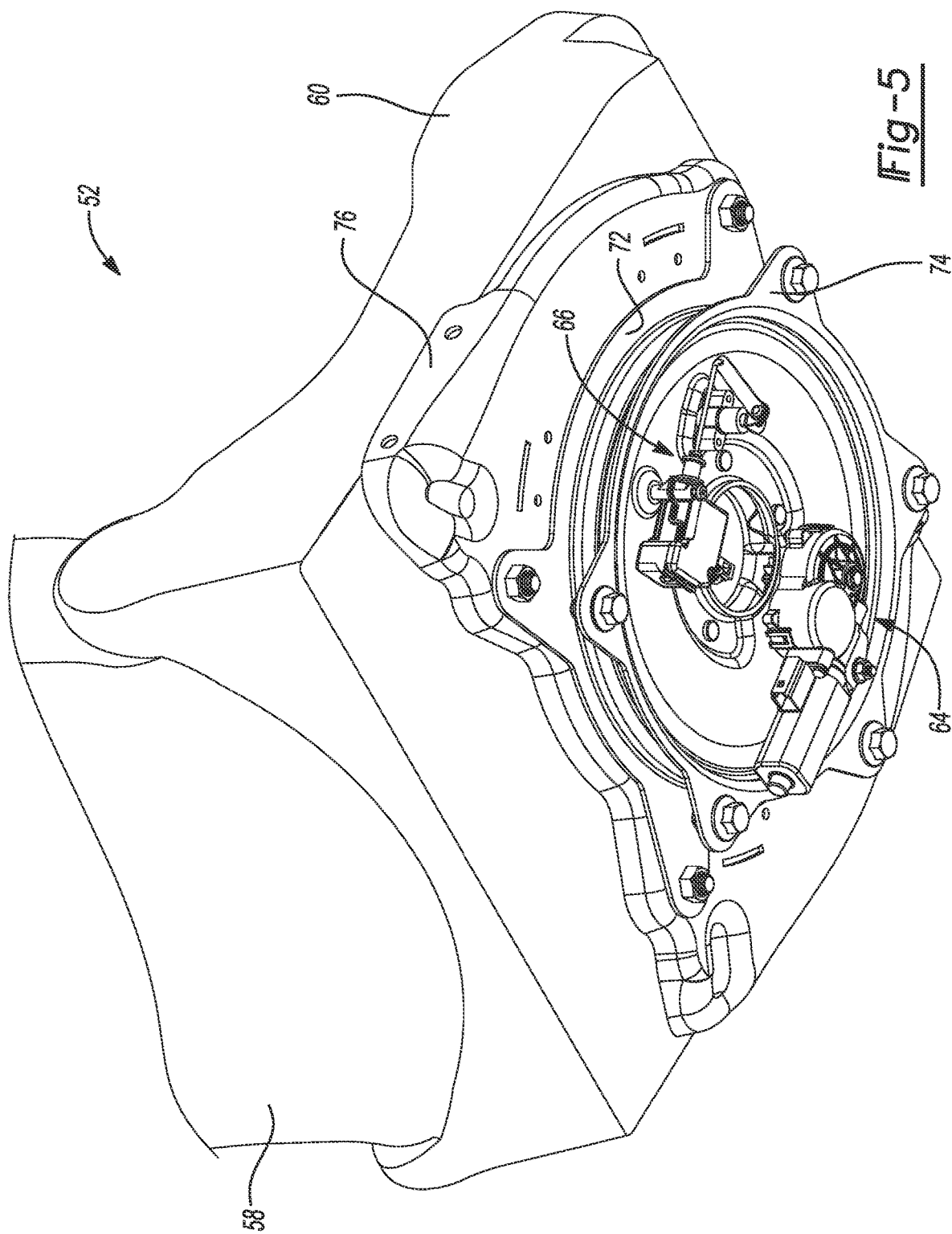
FIG. 5 is a perspective view of the swivel assembly in the second angular position.

With reference to FIGS. 1-6, the swivel assembly 56 may include two or more seat plates (e.g., two or more of an upper plate 70, rotating plate 72, or lower plate 74), a gear ring 62, a swivel motor assembly 64, a locking pin assembly 66, and a control module 68. The upper plate 70 is fixedly attached to the lower plate 74, the rotating plate 72 is fixedly attached to the seat bottom 60, and the lower plate 74 is fixedly attached to the floor 57. Accordingly, the upper and lower plates 70, 74 are fixed relative to the floor 57 of the vehicle 50, and the rotating plate 72 may be movable with the seat 54 relative to the floor 57 between the first angular position (FIGS. 1 and 4) and the second angular position (FIGS. 2 and 5). More specifically, the rotating plate 72 may be attached to the seat bottom 60 via a seat pan 76. The seat pan 76 may have a central aperture 78 and may include a first pan end 80 fixedly attached to the seat bottom 60 and a second pan end 82 fixedly attached to the rotating plate 72. The lower plate 74 is attached to the floor 57 of the vehicle 50 using a support bracket 86. The support bracket 86 may include a first bracket end 88 fixedly attached to the lower plate 74 and a second bracket end 90 fixedly attached to the floor 57 of the vehicle 50.

Figure 6:
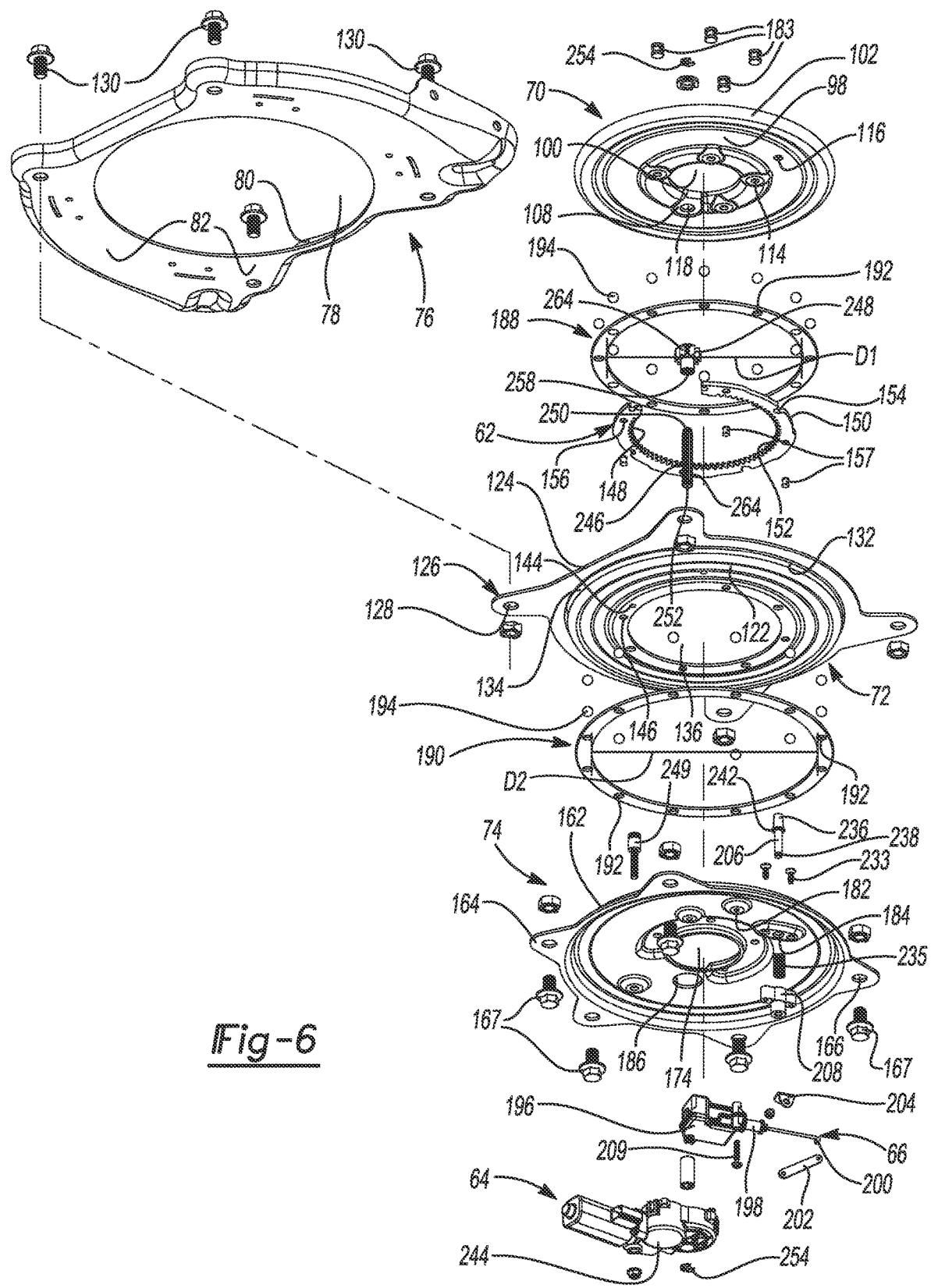
FIG. 6 is an exploded view of the swivel assembly.
Figure 7:
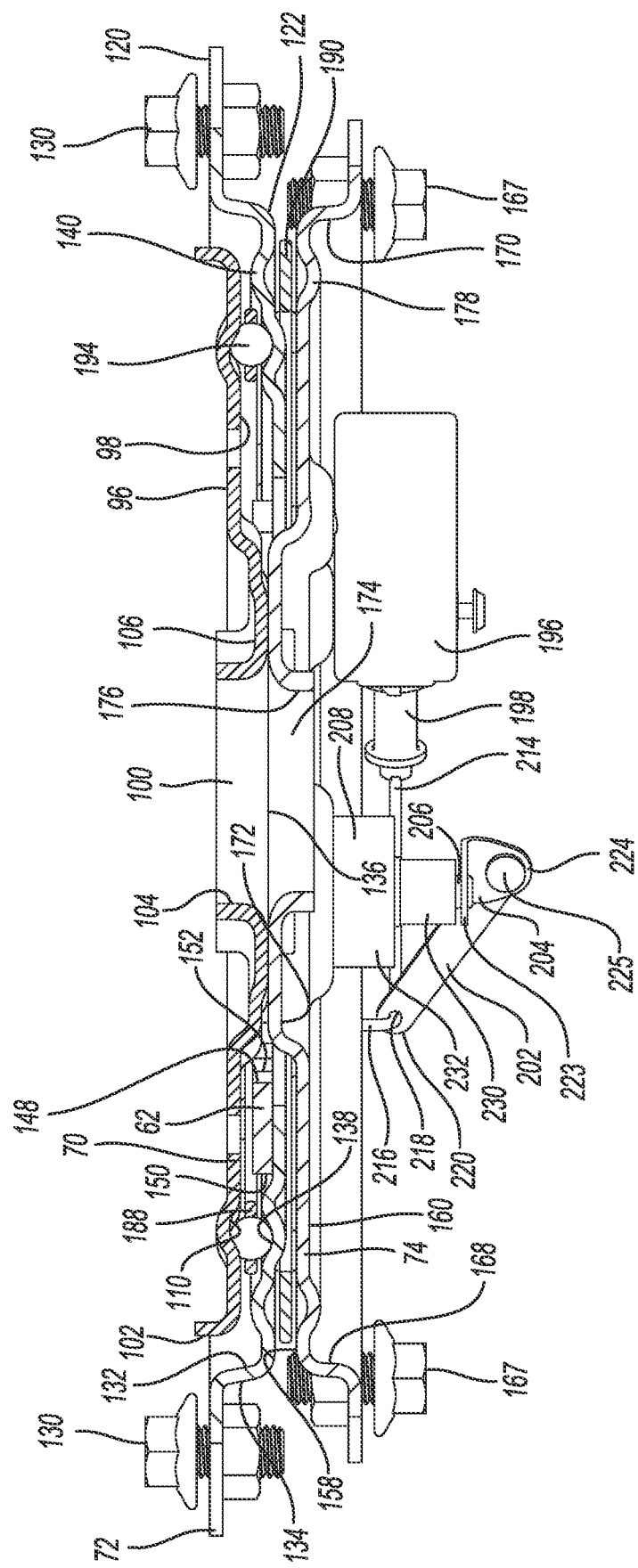
FIG. 7 is a cross-sectional view of the swivel assembly.

With reference to FIGS. 6-7, the upper plate 70 may include a first side 96 facing the seat bottom 60 (FIG. 5) and a second side 98 facing the rotating plate 72. A central aperture 100 may extend through the upper plate 70. An outer flange 102 may extend annularly about the central aperture 100. The outer flange 102 may define a radially outer perimeter of the upper plate 70. A distal end of the outer flange 102 may extend in a generally axial direction toward the seat bottom 60. An inner flange 104 may extend annularly about the central aperture 100. A distal end of the inner flange 104 may extend in a generally axial direction toward the seat bottom 60 (FIG. 5). The upper plate 70 may be formed in a variety of shapes (e.g., circular or polygonal).

The first side 96 of the upper plate 70 may include an annular protrusion 106 that is disposed adjacent to (and/or defined by) an outer periphery of the inner flange 104. The second side 98 of the upper plate 70 may include a recess 108 that extends across the annular protrusion 106 such that the annular protrusion 106 does not form a complete ring. An annular first groove 110 is formed in the second side 98 of the upper plate 70 and extends around the central aperture 100. The first groove 110 is positioned radially between the annular protrusion 106 and the outer flange 102.

The upper plate 70 may include a plurality of apertures (e.g., a plurality of first apertures 114, a second aperture 116, and a third aperture 118) extending through the upper plate 70. Each aperture in the plurality of first apertures 114 may be positioned to extend into the annular protrusion 106 and be disposed radially outward relative to the central aperture 100. The second aperture 116 may be positioned radially between the annular protrusion 106 and the first groove 110. The third aperture 118 may extend into the recess 108. The upper plate 70 may be disposed within the central aperture 78 of the seat pan 76.

With continued reference to FIGS. 6-7, the rotating plate 72 may include a first side 120 facing the upper plate 70 and a second side 122 facing the lower plate 74. The rotating plate 72 may further include a body 124 and one or more arms 126 extending from the body 124. Each arm 126 may include an aperture 128 such that a mechanical fastener 130 (e.g., bolt, screw, rivets, etc.) may extend through the aperture 128. The body 124 of the rotating plate 72 may define a recess 132 such that a sidewall 134 of the recess 132 has a shape that corresponds to the shape and contour of the outer flange 102 of the upper plate 70. A central aperture 136 may extend through the body 124 of the rotating plate 72.

The rotating plate 72 may include a second groove 138 and a third groove 140 disposed within the recess 132. The second groove 138 may be formed in the first side 120 of the rotating plate 72 and the third groove 140 may be formed in the second side 122 of the rotating plate 72. The second and third grooves 138, 140 extend annularly about the central aperture 136. The second groove 138 is substantially aligned with the first groove 110 of the upper plate 70. Additionally, the third groove 140 is positioned radially outward relative to the second groove 138. In other words, the third groove 140 is disposed radially between the second groove 138 and the sidewall 134 of the rotating plate 72. In some embodiments, the second and third grooves 138, 140 may be radially spaced apart. In other embodiments, the second and third grooves 138, 140 may be positioned directly adjacent to each other.

The rotating plate 72 may include a plurality of apertures (e.g., a plurality of first apertures 144, and a plurality of second apertures 146) extending through the body 124 of the rotating plate 72. The plurality of first apertures 144 may be positioned radially between the central aperture 136 and the second groove 138 and spaced apart annularly about the central aperture 136. The plurality of second apertures 146 may be positioned radially between the central aperture 136 and the second groove 138 and spaced apart annularly about the central aperture 136.

Figure 8:
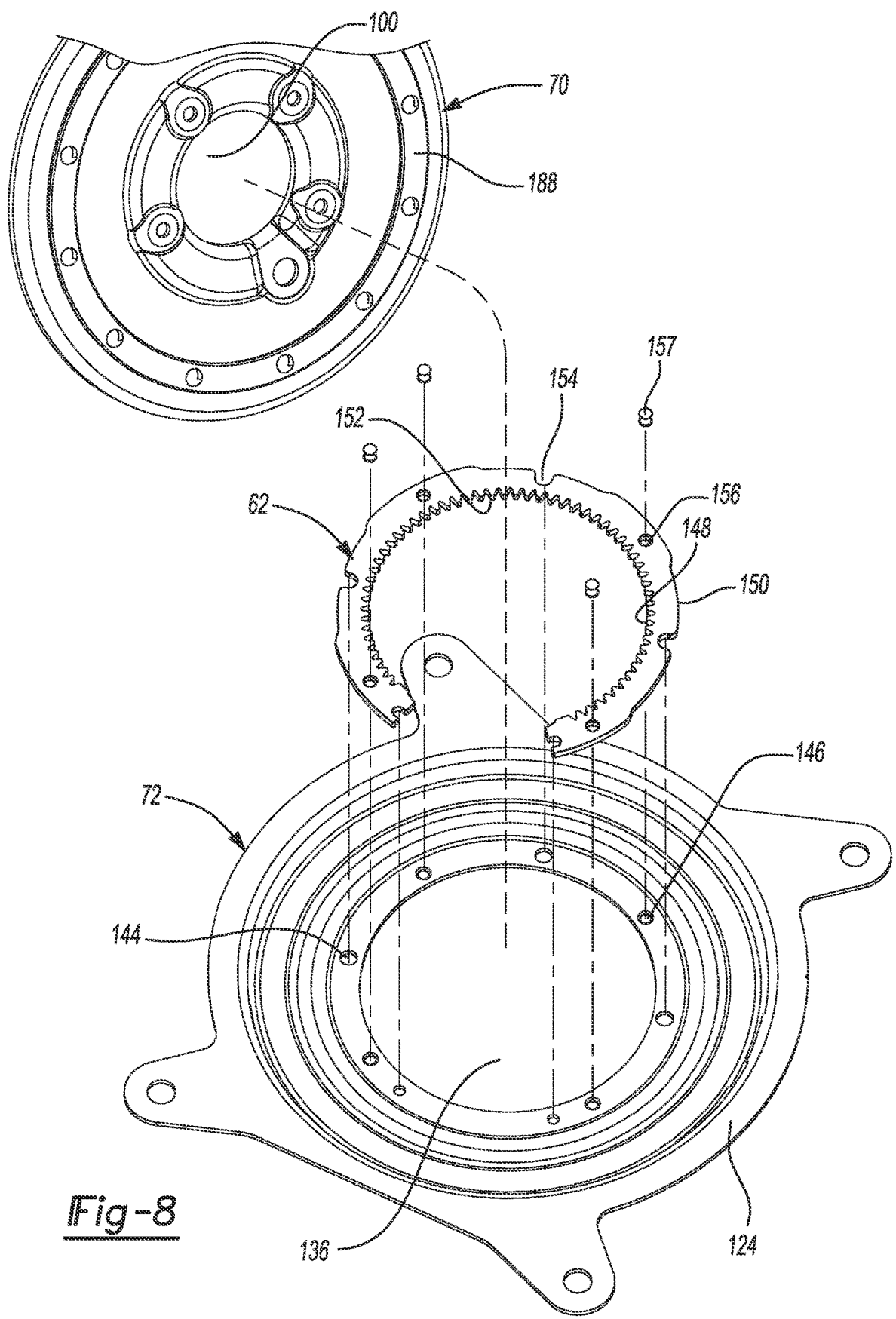
FIG. 8 is a partial exploded view of an upper plate, a gear ring, and a rotating plate of the swivel assembly.

As shown in FIGS. 6-8, the gear ring 62 may include an inner diametrical surface 148 and an outer diametrical surface 150. The inner diametrical surface 148 may include a plurality of inner teeth 152. The outer diametrical surface 150 may include a plurality of slots 154. The slots 154 are positioned to be aligned with the second apertures 146 of the rotating plate 72 (FIG. 8). Additionally, a plurality of apertures 156 may extend through the gear ring 62 such that the apertures 156 are aligned with the first apertures 144 of the rotating plate 72 (FIG. 8). The gear ring 62 may be fixedly attached to the rotating plate 72 using one or more mechanical fasteners 157 extending through the first apertures 144 of the rotating plate 72 and the apertures 156 of the gear ring 62. As illustrated in FIG. 7, the outer diametrical surface 150 of the gear ring 62 may be positioned adjacent to the second groove 138 of the rotating plate 72 and the inner diametrical surface 148 of the gear ring 62 may be positioned adjacent to the annular protrusion 106 of the upper plate 70. In other words, the inner teeth 152 are positioned radially between the rotating plate 72 and the annular protrusion 106 of the upper plate 70.

With continued reference to FIGS. 6-7, the lower plate 74 may include a first side 158 facing the rotating plate 72 and a second side 160 facing the floor 57 of the vehicle 50. The lower plate 74 may further include a body 162 and one or more arms 164 extending from the body 162. Each arm 164 may include an aperture 166 through which a mechanical fastener 167 (e.g., bolt, screw, rivets, etc.) may extend. The body 162 may define a recess 168 defined by a sidewall 170 that may be formed to generally mirror the sidewall 134 of the rotating plate 72. The body 162 may include a second recess 172 that is aligned with and abuts the annular protrusion 106 of the upper plate 70. A central aperture 174 may extend through the body 162 of the lower plate 74. The lower plate 74 may include an inner flange 176 that defines the central aperture 174. The inner flange 176 may extend in the opposite direction as the inner flange 104 of the upper plate 70. In other words, the inner flange 176 may extend toward the floor 57 of the vehicle 50 (i.e., away from the upper plate 70).

The lower plate 74 may include a fourth groove 178 that extends annularly about the central aperture 174 and is positioned radially between the second recess 172 and the sidewall 170. The fourth groove 178 is aligned with the positioning of the third groove 140 of the rotating plate 72.

Figure 9:
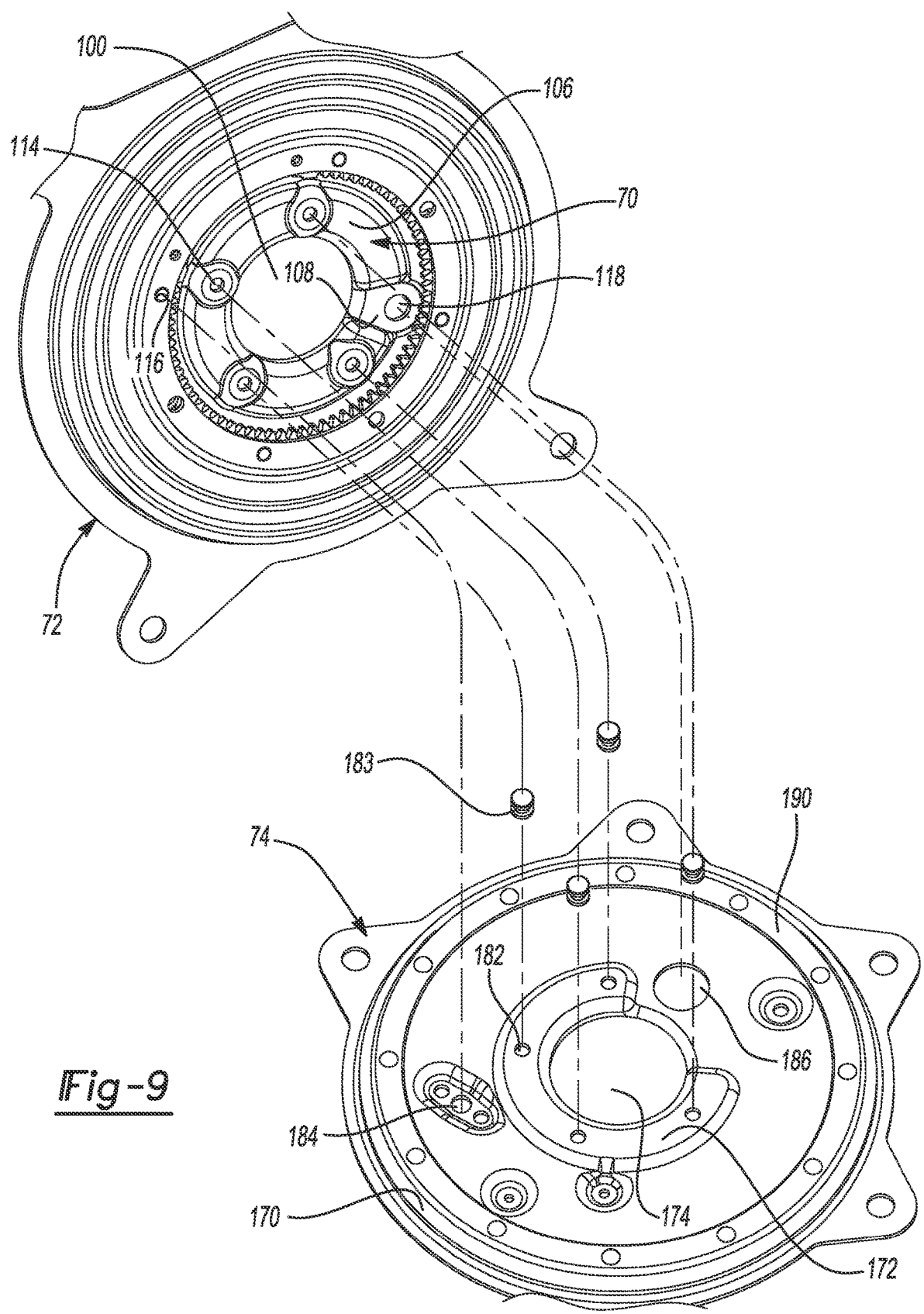
FIG. 9 is a partial exploded view of the swivel assembly.

The lower plate 74 may include a plurality of apertures (e.g., a plurality of first apertures 182, a second aperture 184, and a third aperture 186) extending through the body 162 of the lower plate 74. As shown in FIG. 9, the first apertures 182 are aligned with the first apertures 114 of the upper plate 70. Mechanical fasteners 183 may extend through the first apertures 114 of the upper plate 70 and the first apertures 182 of the lower plate 74 to fixedly secure the upper plate 70 and lower plate 74 such that the annular protrusion 106 of the upper plate 70 abuts the second recess 172 of the lower plate 74 and the central aperture 100 of the upper plate 70 is aligned with the central aperture 174 of the lower plate 74. The second aperture 184 may be positioned radially between the sidewall 170 and the second recess 172 and aligned with the second aperture 116 of the upper plate 70. The third aperture 186 may be positioned adjacent to the central aperture 174 and aligned with the third aperture 118 of the upper plate 70.

Figure 10:
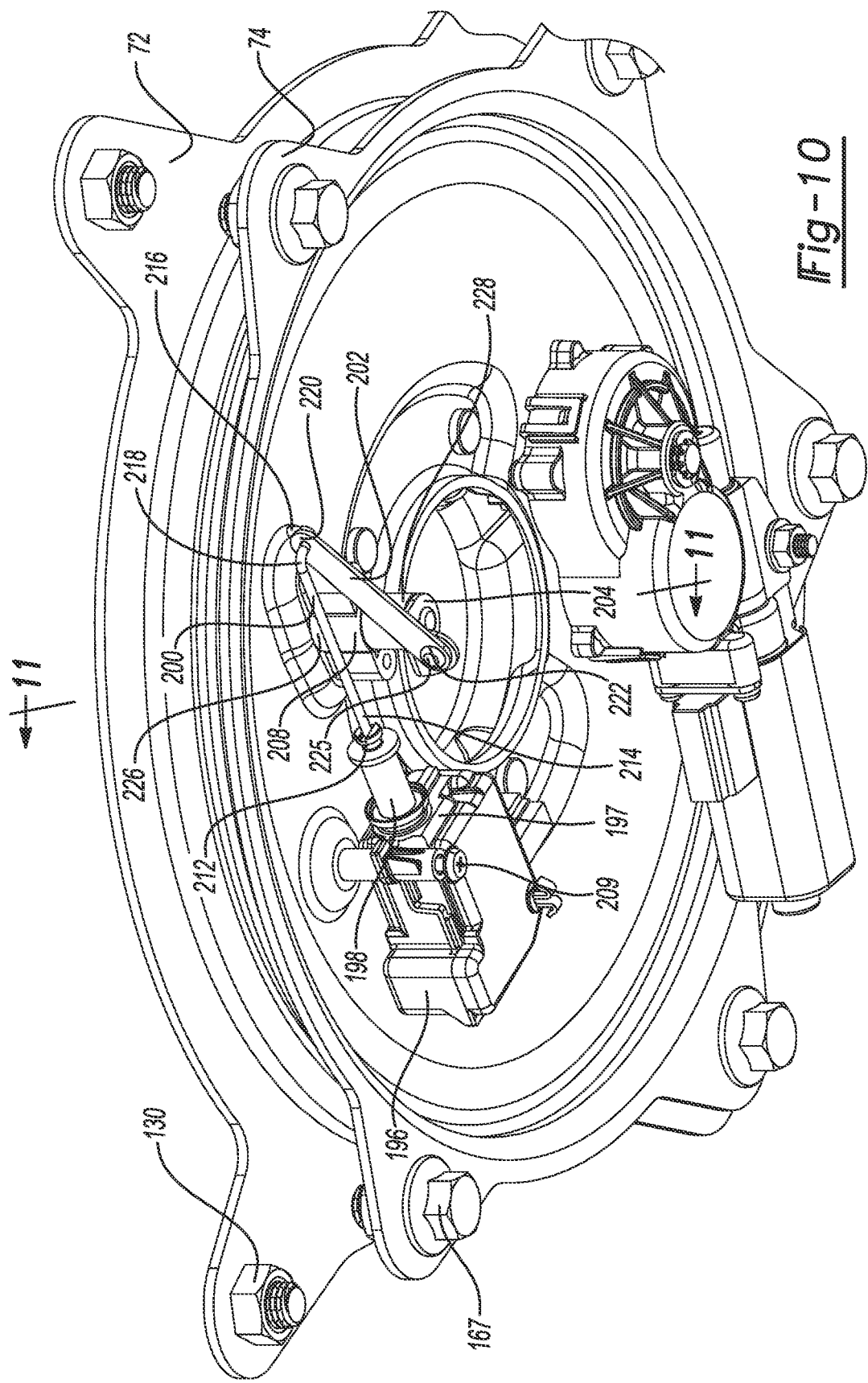
FIG. 10 is a perspective view of a locking pin assembly in a locked position.

With continued reference to FIGS. 6-7, a first ball bearing ring 188 is disposed between the upper plate 70 and the rotating plate 72 at the first and second grooves 110, 138. A second ball bearing ring 190 is disposed between the rotating plate 72 and the lower plate 74 at the third and fourth grooves 140, 178. The first ball bearing ring 188 has an inner diameter D1 and the second ball bearing ring 190 has an inner diameter D2. The inner diameter D2 is greater than the inner diameter D1. Each of the first and second ball bearing rings 188, 190 includes a plurality of apertures 192 that are angularly spaced apart from each other. A ball bearing 194 is partially disposed within each of the apertures 192 and rotatable within the apertures 192. Each of the grooves 110, 138, 140, 178 is shaped and contoured to the shape and contour of the ball bearings 194. More specifically, the ball bearings 194 of the first ball bearing ring 188 are partially received in the first groove 110 and the second groove 138. The ball bearings 194 of the second ball bearing ring 190 are partially received in the third groove 140 and the fourth groove 178 (FIG. 10).

Figure 11:
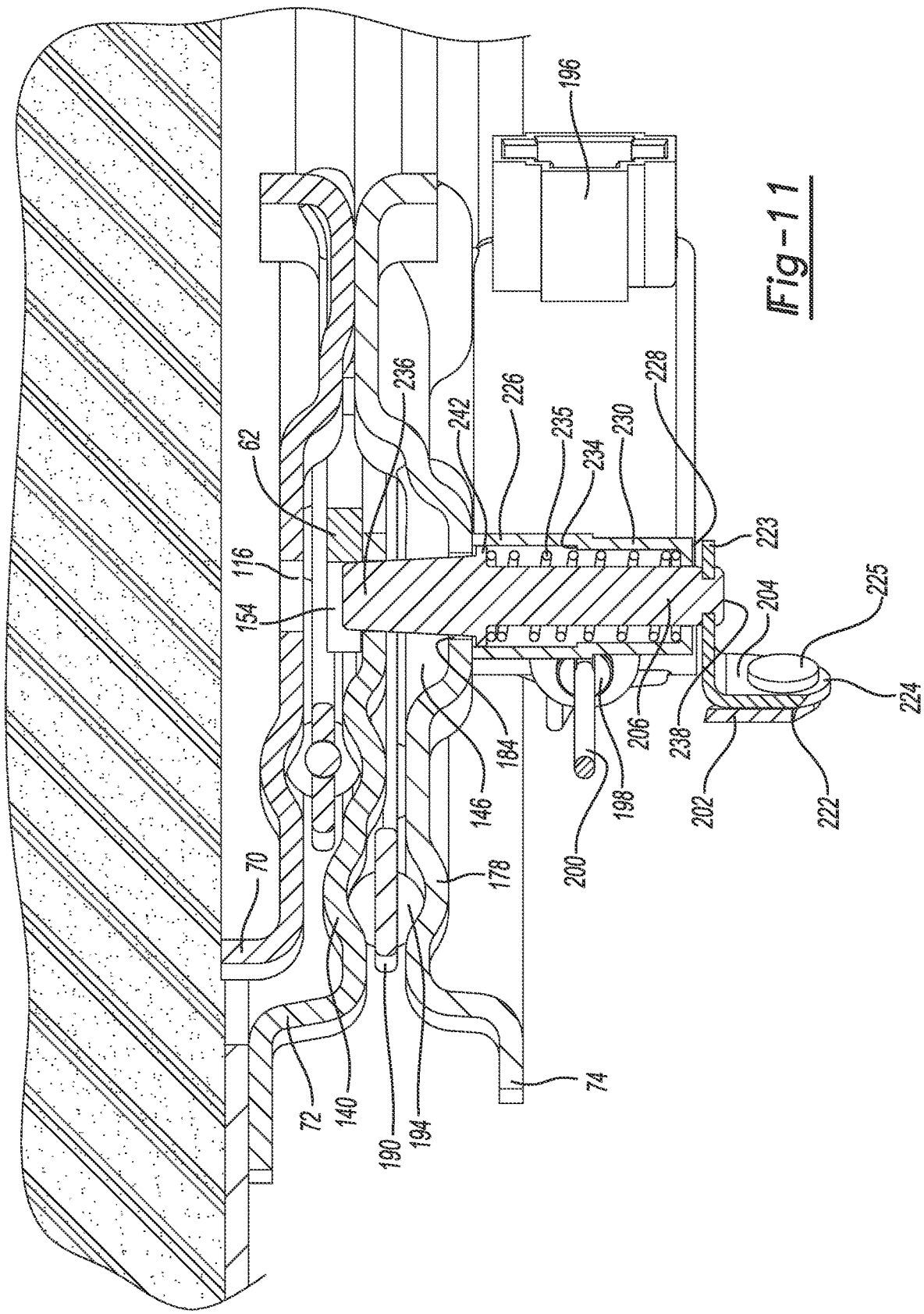
FIG. 11 is a partial sectional view of the locking pin assembly in the locked position.
Figure 12:
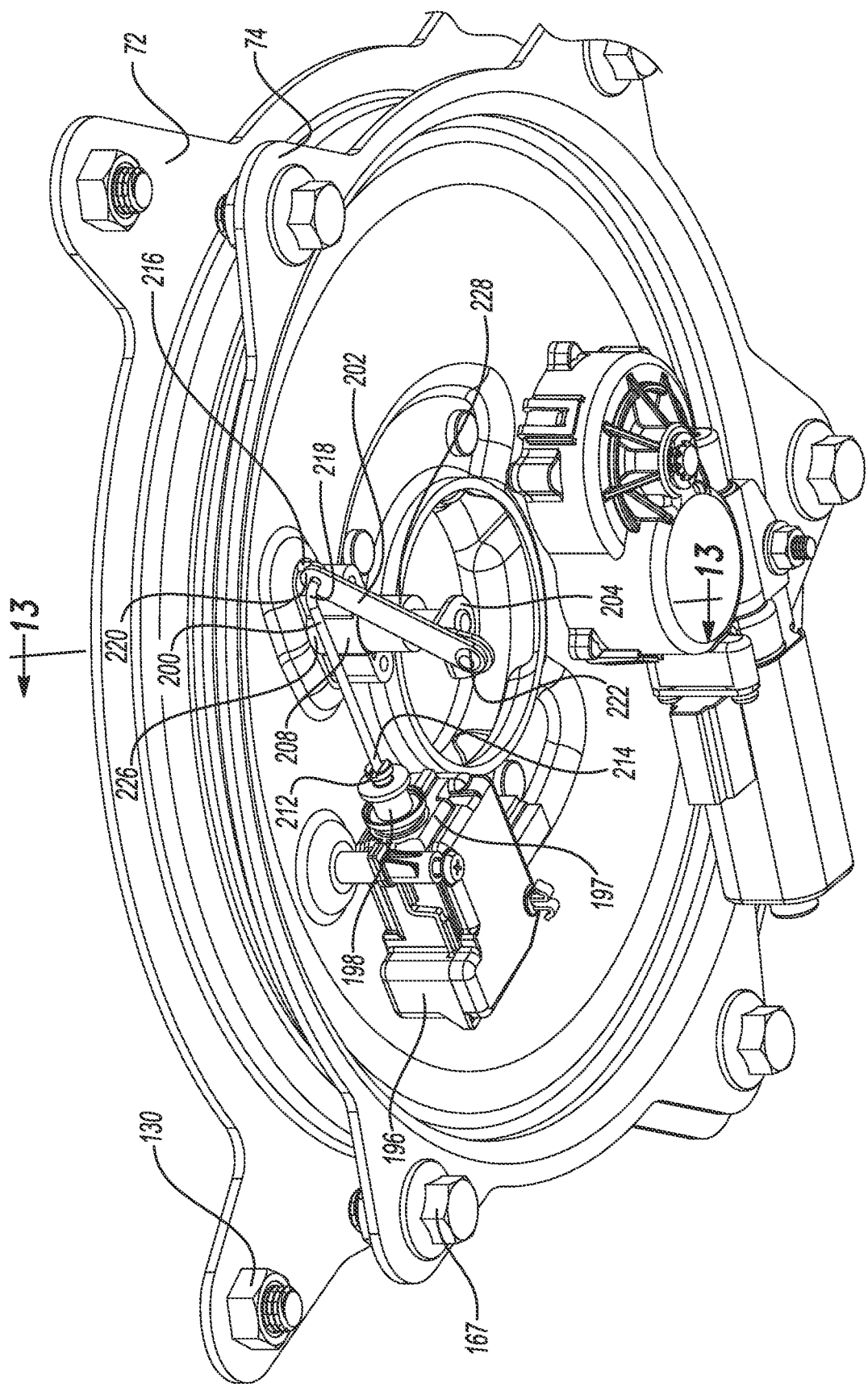
FIG. 12 is a perspective view of the locking pin assembly in an unlocked position.
Figure 13:
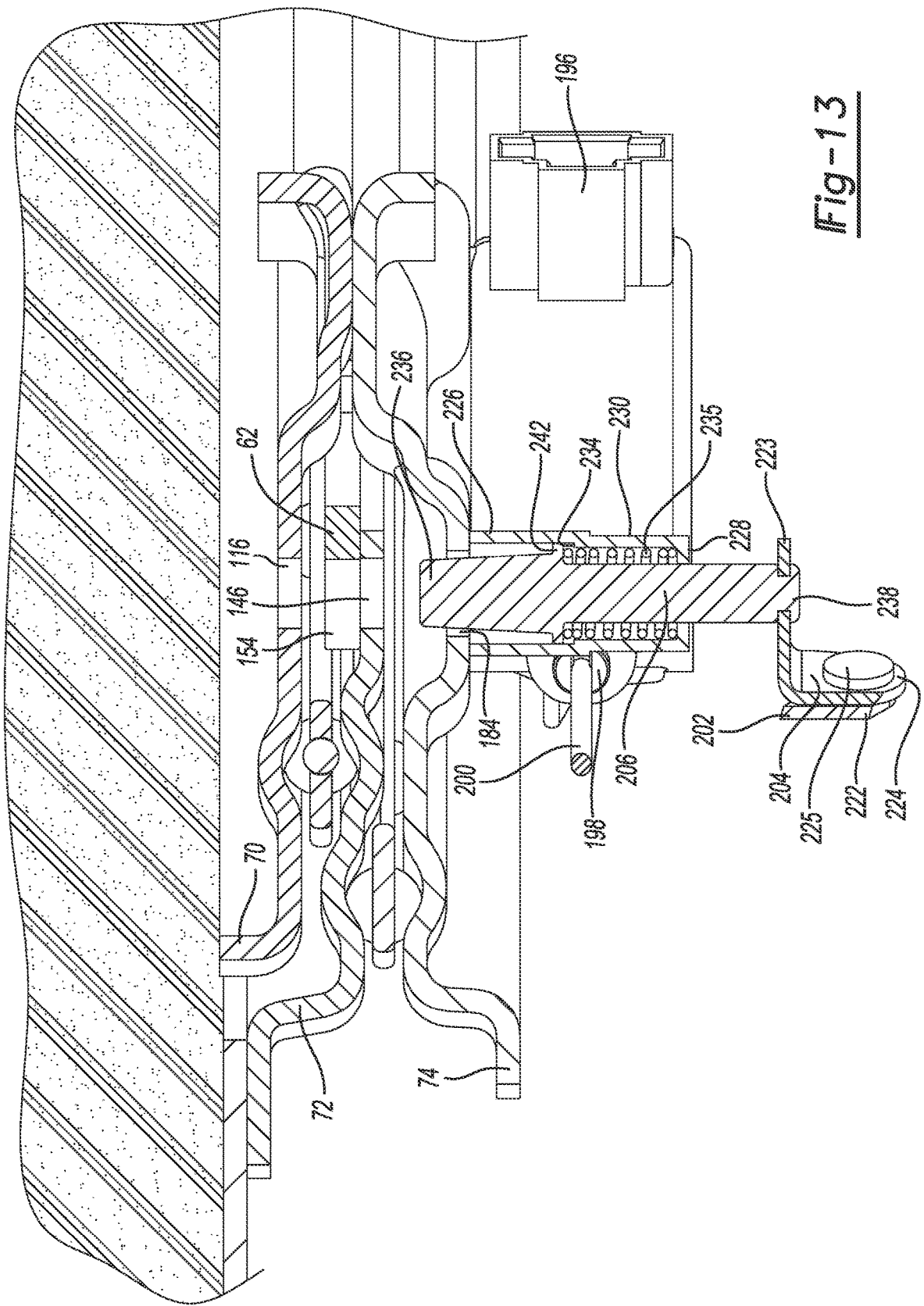
FIG. 13 is a partial sectional view of the locking pin assembly in the unlocked position.
Figure 14:
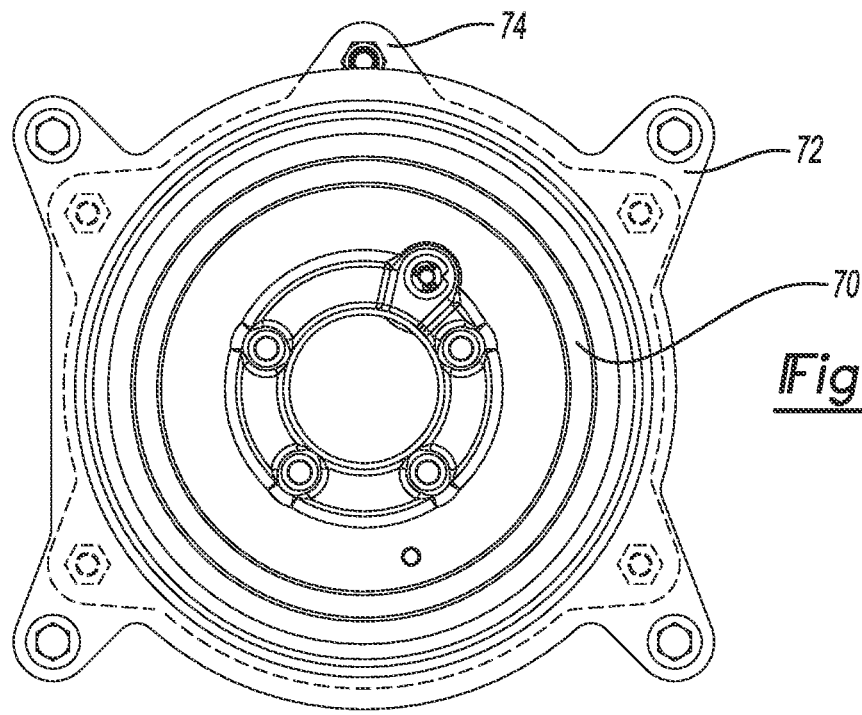
FIG. 14 is a top view of the swivel assembly in the first angular position and the locked position.

With continued reference to FIGS. 6-7 and additional reference to FIGS. 10-13, the locking pin assembly 66 is movable between a locked position (FIGS. 10-11) and an unlocked position (FIGS. 12-13). The locking pin assembly 66 may include an actuator 196, a plunger 198, a rod 200, a connecting link 202, a connecting bracket 204, a locking pin 206, and a locking pin housing 208. The actuator 196 may be fixedly attached to the lower plate 74 using one or more mechanical fasteners 209, or any other suitable fastening technique. The plunger 198 may be reciprocatingly received in a housing 197 of the actuator 196. An end 212 of the plunger 198 may be attached to the rod 200. Actuation of the actuator 196 may cause the plunger 198 to move linearly relative to the actuator housing 197 (i.e., such that the end 212 of the plunger 198 moves toward the actuator housing 197) from the position shown in FIG. 10 (corresponding to the locked position) to the position shown in FIG. 12 (corresponding to the unlocked position).

The rod 200 may have a first rod end 214 and a second rod end 216. The first rod end 214 may be received within (or otherwise attached to) the plunger 198. The second rod end 216 may be connected to the connecting link 202. For example, the second rod end 216 may include a curvature (or hook portion) 218 received in an aperture in the connecting link 202 to movably connect the rod 200 to the connecting link 202.

The connecting link 202 may include a first link end 220 and a second link end 222. The connecting bracket 204 may include a first bracket end 223 and a second bracket end 224. The connecting link 202 may be formed in a substantially linear shape. The connecting bracket 204 may be formed in an "L" shape. The second link end 222 of the connecting link 202 may be attached to the second bracket end 224 of the connecting bracket 204 using a mechanical fastener 225. Additionally, the first link end 220 of the connecting link 202 may be attached to the second rod end 216. The first bracket end 223 of the connecting bracket 204 may be coupled to the locking pin housing 208 using the locking pin 206.

The locking pin housing 208 may have a first housing end 226 and a second housing end 228. Additionally, the locking pin housing 208 may include a cylindrical tube 230 with a pair of arms 232 extending transversely from the cylindrical tube 230. The first housing end 226 may be fixedly attached to the lower plate 74 using one or more mechanical fasteners 233 (FIG. 6) extending through the pair of arms 232 (FIG. 7), or any other suitable fastening technique. A locking pin seat 234 may be disposed within the cylindrical tube 230 between the first and second housing ends 226, 228.

As shown in FIG. 11, the locking pin 206 and a spring 235 may be disposed within the cylindrical tube 230 of the locking pin housing 208. The locking pin 206 may have a first pin end 236 and a second pin end 238. The second pin end 238 may be coupled to the first bracket end 223 of the connecting bracket 204 to secure the locking pin 206 with the connecting bracket 204. The locking pin 206 may include a flange 242 that extends radially outward and is positioned between the first pin end 236 and the second housing end 228. The spring 235 may extend helically about the locking pin 206 and may be positioned between the flange 242 and the second housing end 228. The spring 235 biases the locking pin 206 toward the locked position (FIG. 11).

The locking pin 206 and the locking pin housing 208 may be positioned substantially perpendicular to the upper plate 70, rotating plate 72, and lower plate 74. In the locked position (FIG. 11), the locking pin 206 may extend through (or at least partially into) the second aperture 184 of the lower plate 74, one of the second apertures 146 of the rotating plate 72, and one of the slots 154 of the gear ring 62. In some embodiments, the locking pin 206 may also extend through (or partially into) the second aperture 116 of the upper plate 70 when the locking pin 206 is in the locked position.

Figure 15:
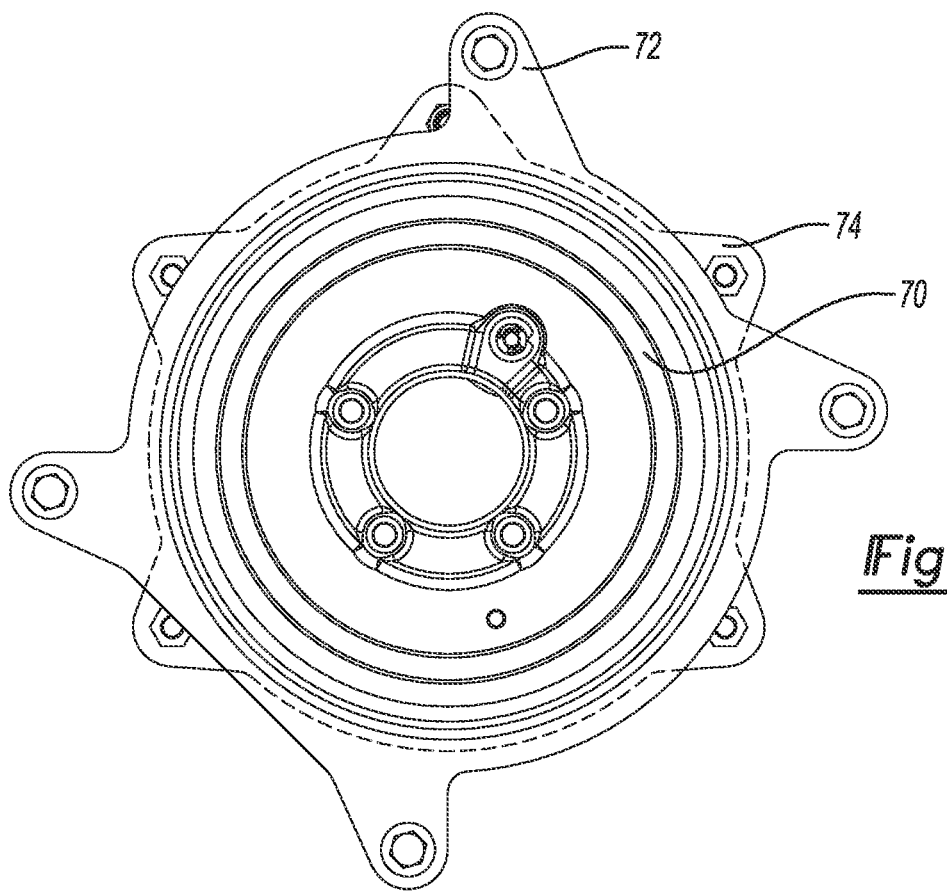
FIG. 15 is a top view of the swivel assembly in an intermediary angular position and the unlocked position.
Figure 16:
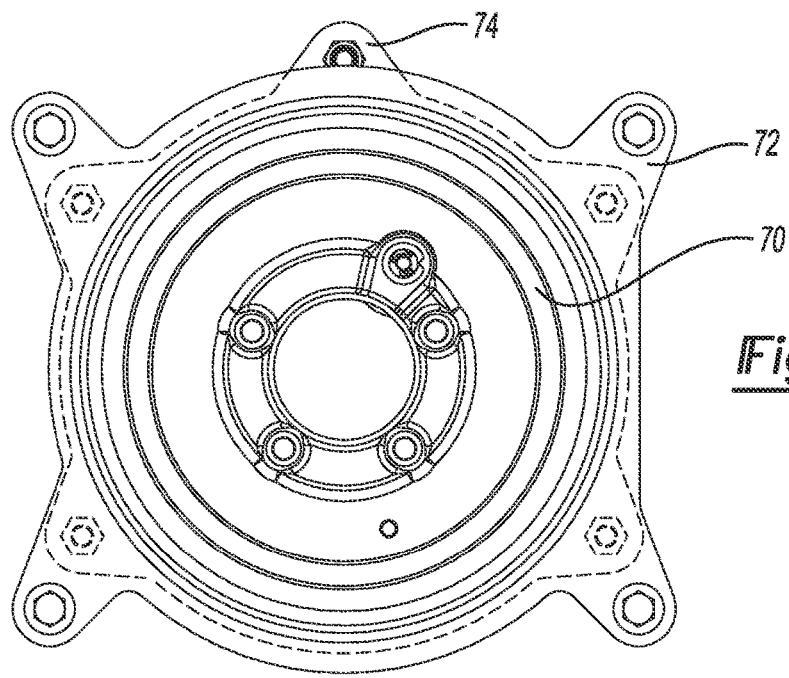
FIG. 16 is a top view of the swivel assembly in the second angular position and the locked position.

When the locking pin 206 is positioned within one of the slots 154 of the gear ring 62 (i.e., when the locking pin 206 is in the locked position), the rotating plate 72 is restricted from rotating relative to the lower plate 74. When the locking pin 206 is moved out of the slots 154 of the gear ring 62 and the second aperture 146 of the rotating plate 72 (i.e., when the locking pin 206 is in the unlocked position, as shown in FIG. 12), the rotating plate 72 is rotatable relative to the lower plate 74. Accordingly, the rotating plate 72 can be locked at a predefined number of positions that correspond to the number of slots 154 in the gear ring 62. The first angular position (FIG. 14) and the second angular position (FIG. 16) previously described are examples of secured positions (i.e., positions at which the locking pin 206 can be moved into the locked position). Additionally, the rotating plate 72 is rotatable to a continuous range of unsecured positions when the locking pin 206 is in the unlocked position. For example, an intermediary position shown in FIG. 15 is one unsecured position.

The actuator 196 may be a solenoid, a linear motor, or any other electromechanical actuator, for example. Actuation of the actuator 196 may cause the plunger 198 to move linearly relative to the actuator housing 197 (i.e., such that the end 212 of the plunger 198 moves toward the actuator housing 197) from the position shown in FIG. 10 (corresponding to the locked position) to the position shown in FIG. 12 (corresponding to the unlocked position). Such movement of the plunger 198 causes corresponding movement of the rod 200, the connecting link 202, and the locking pin 206 from the locked position to the unlocked position, as will be described in more detail below.

Figure 17:
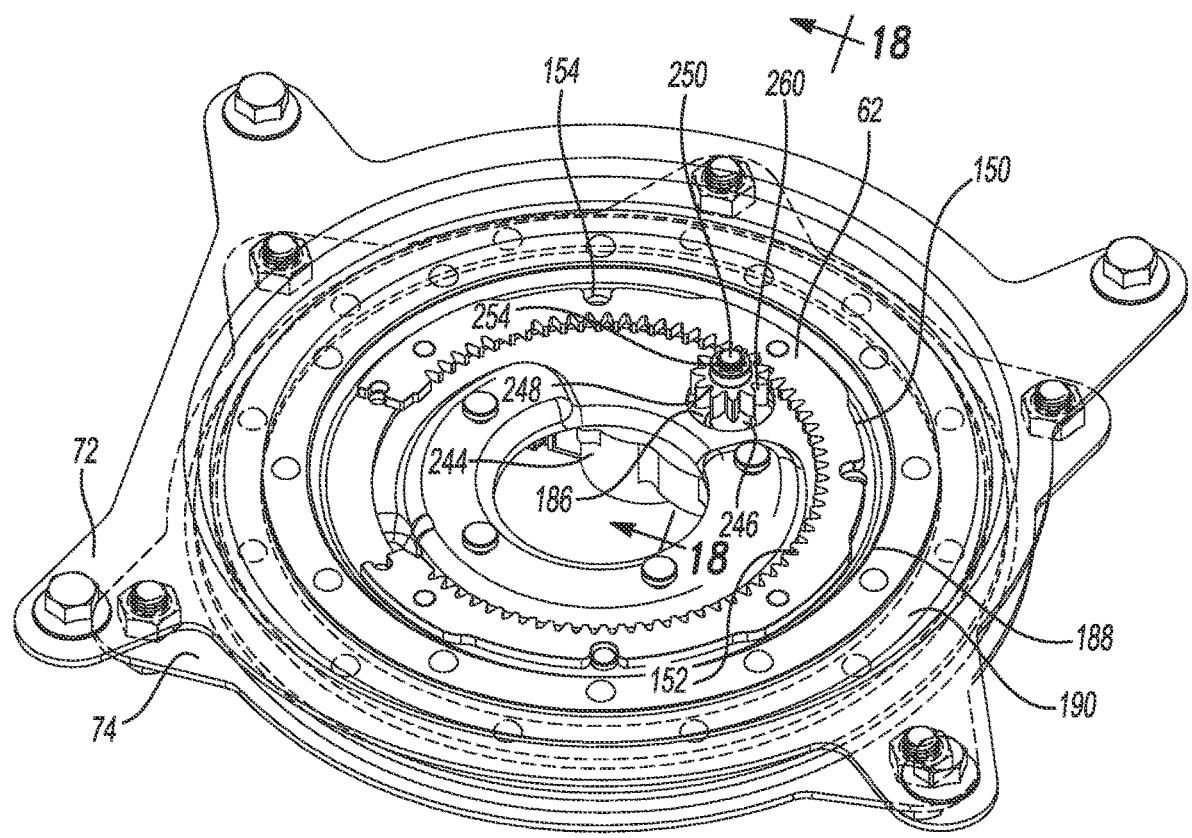
FIG. 17 is a perspective view of the swivel assembly with an upper plate shown in phantom lines.
Figure 18:
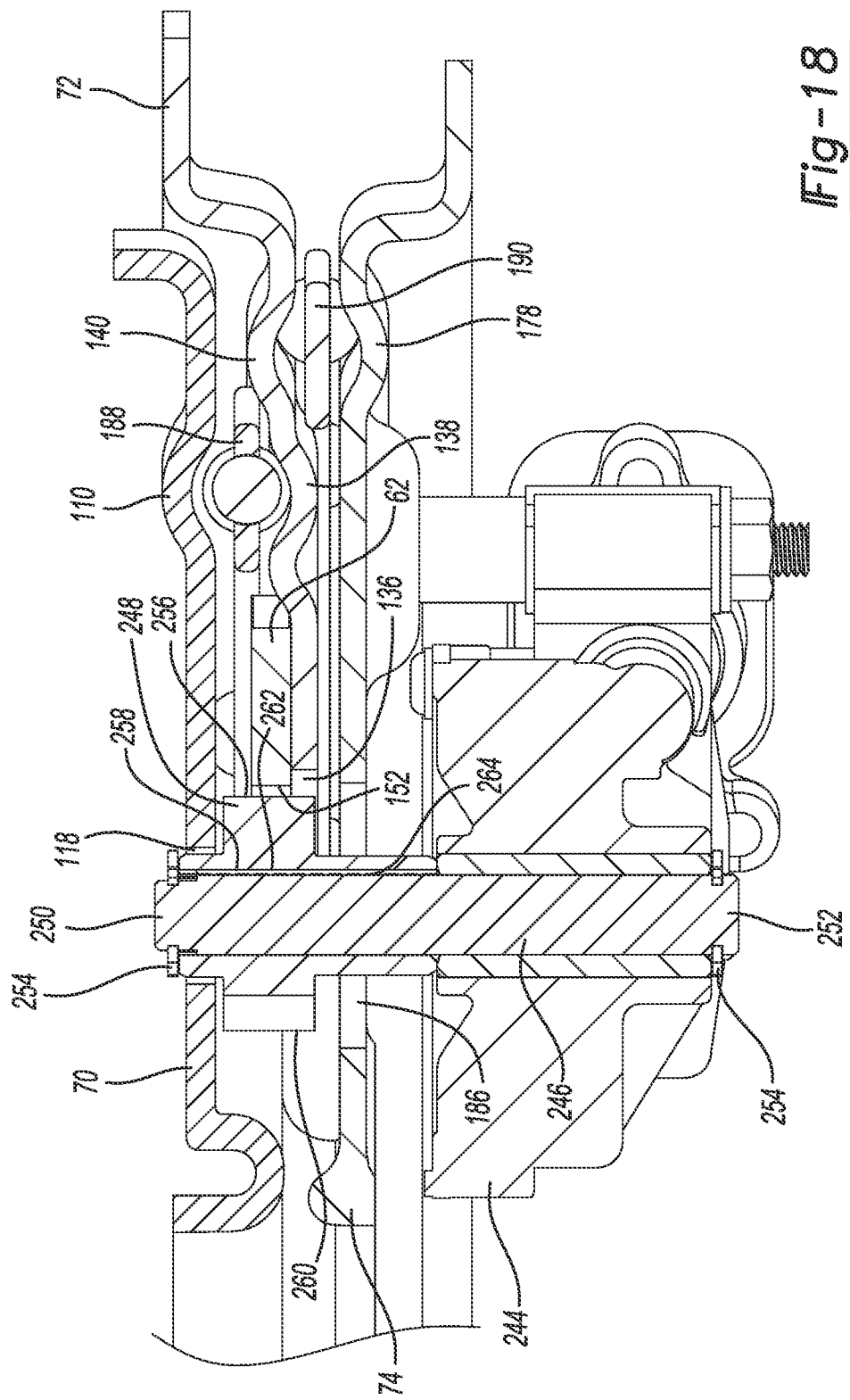
FIG. 18 is a sectional view of a swivel motor assembly.
Figure 19:
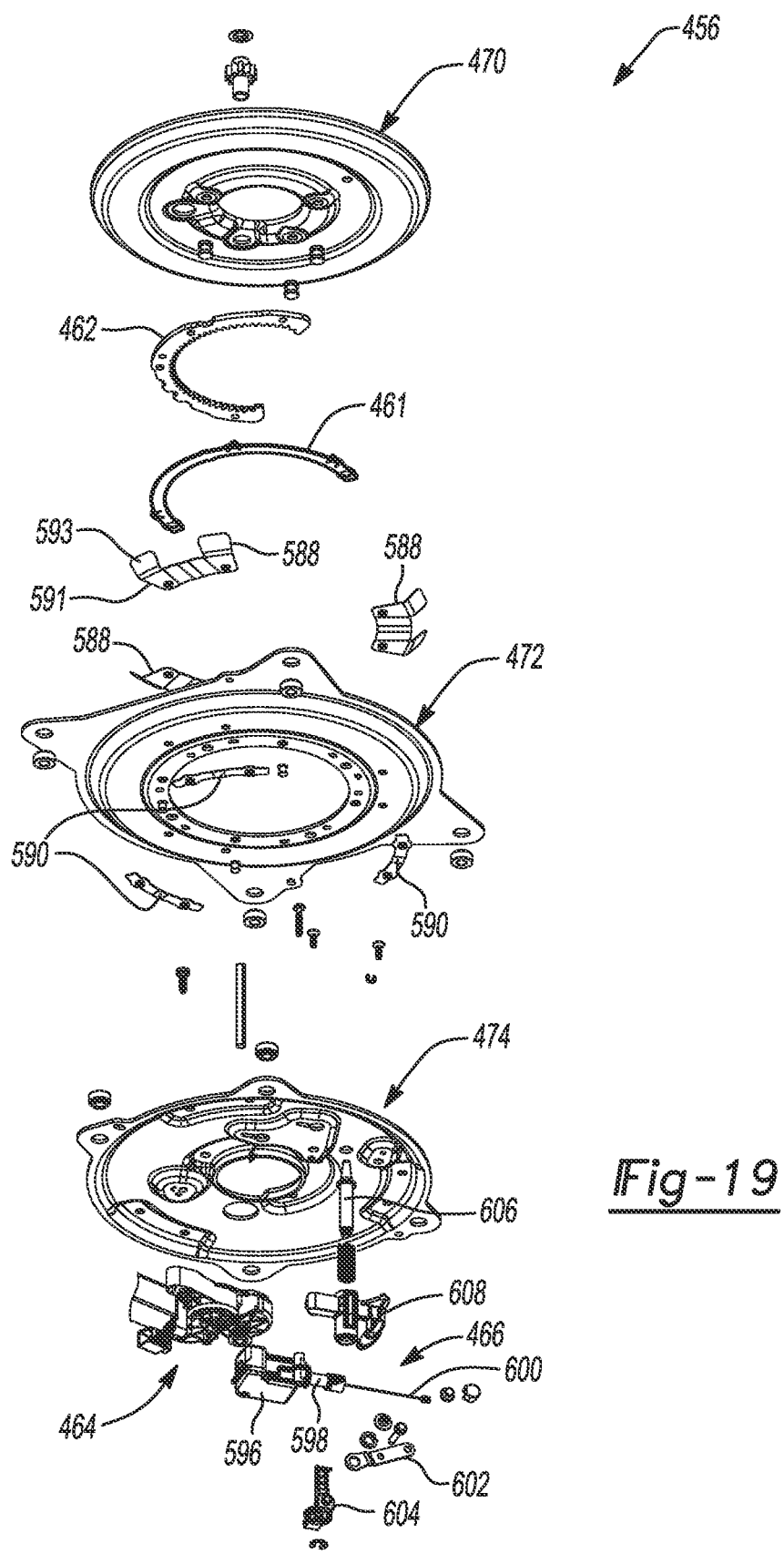
FIG. 19 is an exploded view of another swivel assembly according to the principles of the present disclosure.

With reference to FIGS. 6 and 17-18, the swivel motor assembly 64 may include a motor 244, a gear rod 246, and a gear 248. The motor 244 may be fixedly attached to the lower plate 74 using one or more mechanical fasteners 249, or any other suitable fastening technique. A first rod end 250 of the gear rod 246 may be attached to the upper plate 70 and a second rod end 252 of the gear rod 246 may be attached to the motor 244. The gear rod 246 may extend through the third aperture 186 of the lower plate 74, the central aperture 136 of the rotating plate 72, the third aperture 118 of the upper plate 70, and the motor 244. More specifically, retaining features 254 may be disposed at each of the first and second rod ends 250, 252. The retaining feature 254 at the first rod end 250 is coupled to the third aperture 118 of the upper plate 70 to secure the gear rod 246 to the upper plate 70. The retaining feature 254 at the second rod end 252 is coupled to the motor 244 to secure the gear rod 246 to the motor 244. Operation of the motor 244 causes rotation of the gear rod 246 relative to the plates 70, 72, 74.

The gear 248 may be a ring-shaped or tubular-shaped member having an outer surface 256 and an inner surface 258. The inner surface 258 defines an aperture that receives the gear rod 246 and may include a plurality of splines 262. The splines 262 mesh with splines 264 formed on the outer diametrical surface of the gear rod 246 to rotationally fix the gear 248 to the gear rod 246. The outer surface 256 of the gear may include a plurality of outer teeth 260. The outer teeth 260 of the gear 248 mesh with the inner teeth 152 of the gear ring 62 (as shown in FIG. 17).

With reference to FIGS. 1-18, the operation of the seat assembly 52 will now be described. The user may initiate movement of the seat bottom 60 via a user interface (not shown) that may include switches, buttons, knobs, etc. to control movement of the seat 54 relative to the vehicle 50. The user interface communicates the user's desired seat movement to the control module 68 (FIGS. 1-2).

In response to the user actuating the user interface to cause rotation of the seat 54, the control module 68 causes the locking pin assembly 66 to move the locking pin 206 from the locked position (FIGS. 10-11) to the unlocked position (FIGS. 12-13). Specifically, the actuator 196 may drivingly engage the plunger 198 to move the rod 200 relative to the locking pin housing 208. The plunger 198 may slidably translate into the actuator housing 197 in a telescoping manner, thereby moving the rod 200 in a corresponding and simultaneous direction. Because the rod 200 and the connecting link 202 are attached, movement of the rod 200 causes the connecting link 202 to pivot at the second link end 222. The second link end 222 of the connecting link 202 correspondingly lowers the connecting bracket 204 and the locking pin 206. More specifically, the first pin end 236 lowers from the second aperture 146 of the rotating plate 72 to the second aperture 184 of the lower plate 74 to place the locking pin 206 in the unlocked position. Once the locking pin 206 is placed in the unlocked position, the locking pin assembly 66 communicates with the control module 68.

Once the locking pin 206 is in the unlocked position, the control module 68 signals the swivel motor assembly 64 to move the rotating plate 72. The swivel motor assembly 64 moves the rotating plate 72, thereby moving the seat bottom 60, to the user's requested position. More specifically, the motor 244 may engage the gear rod 246 to rotate. Because the gear rod 246 is fixed to the gear 248, rotation of the gear rod 246 correspondingly and simultaneously rotates the gear 248. Accordingly, the outer teeth 260 of the gear 248 rotate along the inner teeth 152 of the gear ring 62 to causes corresponding and simultaneous rotation of the rotating plate 72. Meanwhile, the first and second ball bearing rings 188, 190 rotate within their respective grooves 110, 138, 140, 178 upon movement of the rotating plate 72. Because the rotating plate 72 is fixed to the seat bottom 60, movement of the rotating plate 72 causes corresponding and simultaneous movement of the seat bottom 60. Once the seat bottom 60 is in the user's desired position, the swivel motor assembly 64 communicates with the control module 68.

Lastly, the control module 68 signals the locking pin assembly 66 to return the locking pin 206 from the unlocked position (FIGS. 12-13) to the locked position (FIGS. 10-11). The plunger 198 may slidably translate outward from the actuator 196 in a telescoping manner, thereby moving the rod 200 in a corresponding and simultaneous direction. Because the rod 200 and the connecting link 202 are attached, movement of the rod causes the connecting link 202 to pivot at the first link end 220. The second link end 222 of the connecting link 202 correspondingly raises the connecting bracket 204 and the locking pin 206. The first pin end 236 moves into one of the slots 154 of the gear ring 62 to restrict movement of the gear ring 62 and to place the locking pin in the locked position. The spring 235 pushes the locking pin 206 toward the locked position, which causes corresponding movement of the connecting link 202, rod 200, and plunger 198. Accordingly, the seat bottom 60 is moved to the user's desired seat position and is secured into position.

As demonstrated, the swivel assembly 56 using the swivel motor assembly 64 and the locking pin assembly 66 is operable to minimize the unintentional movement of the seat plates, including reducing chucking and reducing the likelihood of movement of the seat bottom 60 from the secured position to the unsecured position during a vehicle impact event.

With reference to FIGS. 19-26, another swivel assembly 456 is provided that may be incorporated into the seat assembly 52 instead of the swivel assembly 56. The swivel assembly 456 may move the seat 54 relative to a floor 57 of the vehicle 50, e.g., in an angular direction (e.g., a rotary direction) between a first angular position (FIG. 1) and a second angular position (FIG. 2). Apart from different features described below and/or shown in the figures, the structure and function of the swivel assembly 456 may be similar or identical to that of the swivel assembly 56 described above. Therefore, similar features may not be described again in detail.

Like the swivel assembly 56, the swivel assembly 456 may include swivel assembly 56 may include a plurality of seat plates (e.g., an upper plate 470, a rotating plate 472, and a lower plate 474), a gear ring 462, a swivel motor assembly 464, a locking pin assembly 466, and a control module. The structure and function of the plates 470, 472, 474, gear ring 462, swivel motor assembly 464, and control module may be similar or identical to that of the plates 70, 72, 74, gear ring 62, swivel motor assembly 64, and control module 68 described above.

However, the particular example of the swivel assembly 456 shown in FIGS. 19-26 does not include the ball bearing rings 188, 190 and ball bearings 194. Instead, the swivel assembly 456 may include one or more first bearing plates 588 and one or more second bearing plates 590 (shown in FIGS. 19 and 25). The first bearing plates 588 may be disposed between the upper plate 470 and the rotating plate 472 to facilitate rotation of the rotating plate 472 relative to the upper plate 470. The second bearing plates 590 may be disposed between the rotating plate 472 and the lower plate 474 to facilitate rotation of the rotating plate 472 relative to the lower plate 474. The first and second bearing plates 588, 590 may be formed from a material having a relatively low coefficient of friction. For example, the first and second bearing plates 588, 590 may be formed from TEFLON. The first bearing plates 588 may have a first portion 591 and a second portion 593 that is angled relative to the first portion 591. The first portion 591 is disposed axially between the plates 470, 472, and the second portion 593 is disposed axially and radially between the plates 470, 472. In this manner, the second portion 593 of the first bearing plates 588 reduces relative lateral movement between the plates 470, 472.

Figure 22:
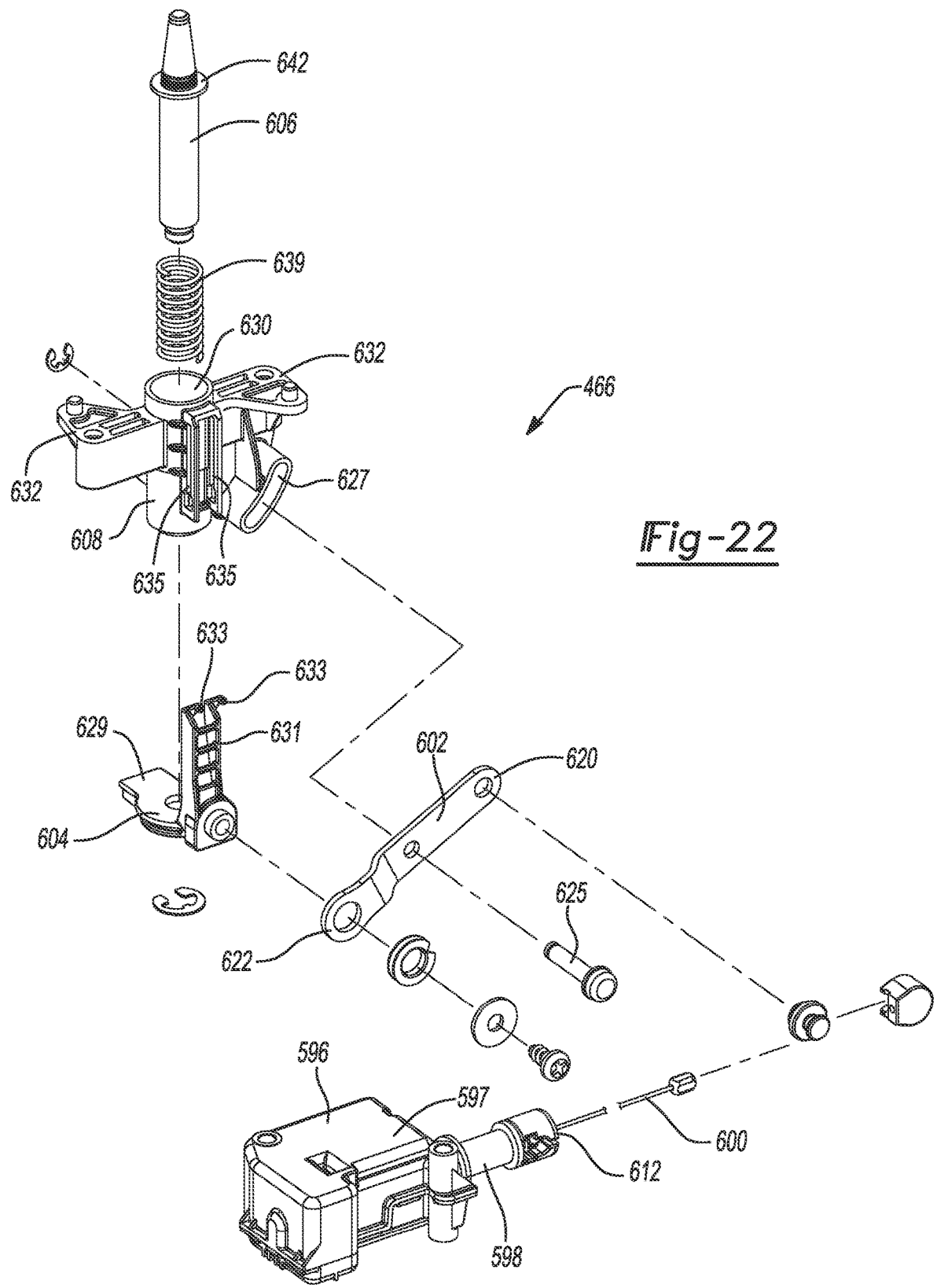
FIG. 22 is an exploded view of the locking pin assembly.
Figure 23:
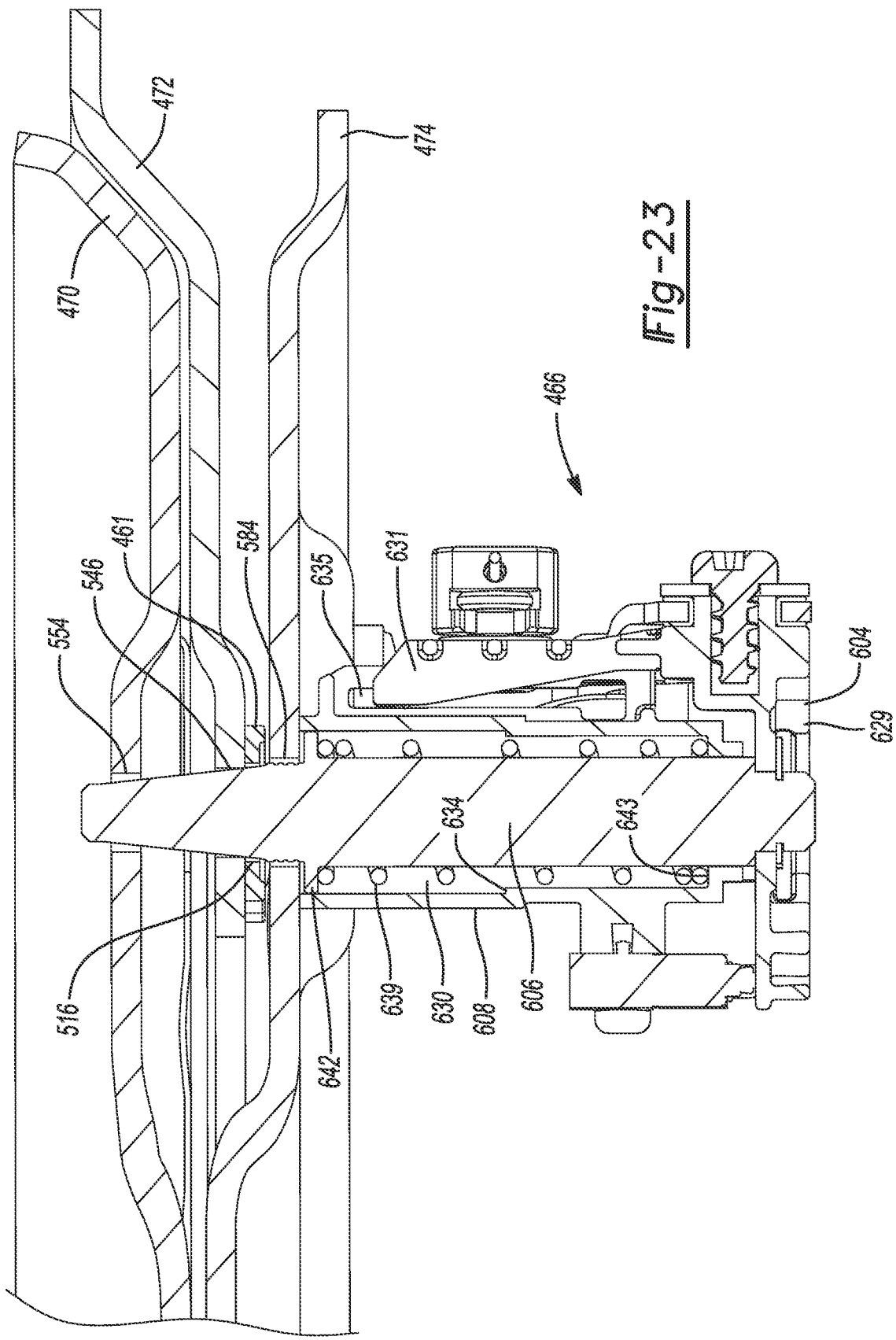
FIG. 23 is a partial cross-sectional view of the swivel assembly with the locking pin assembly in the locked position.
Figure 24:
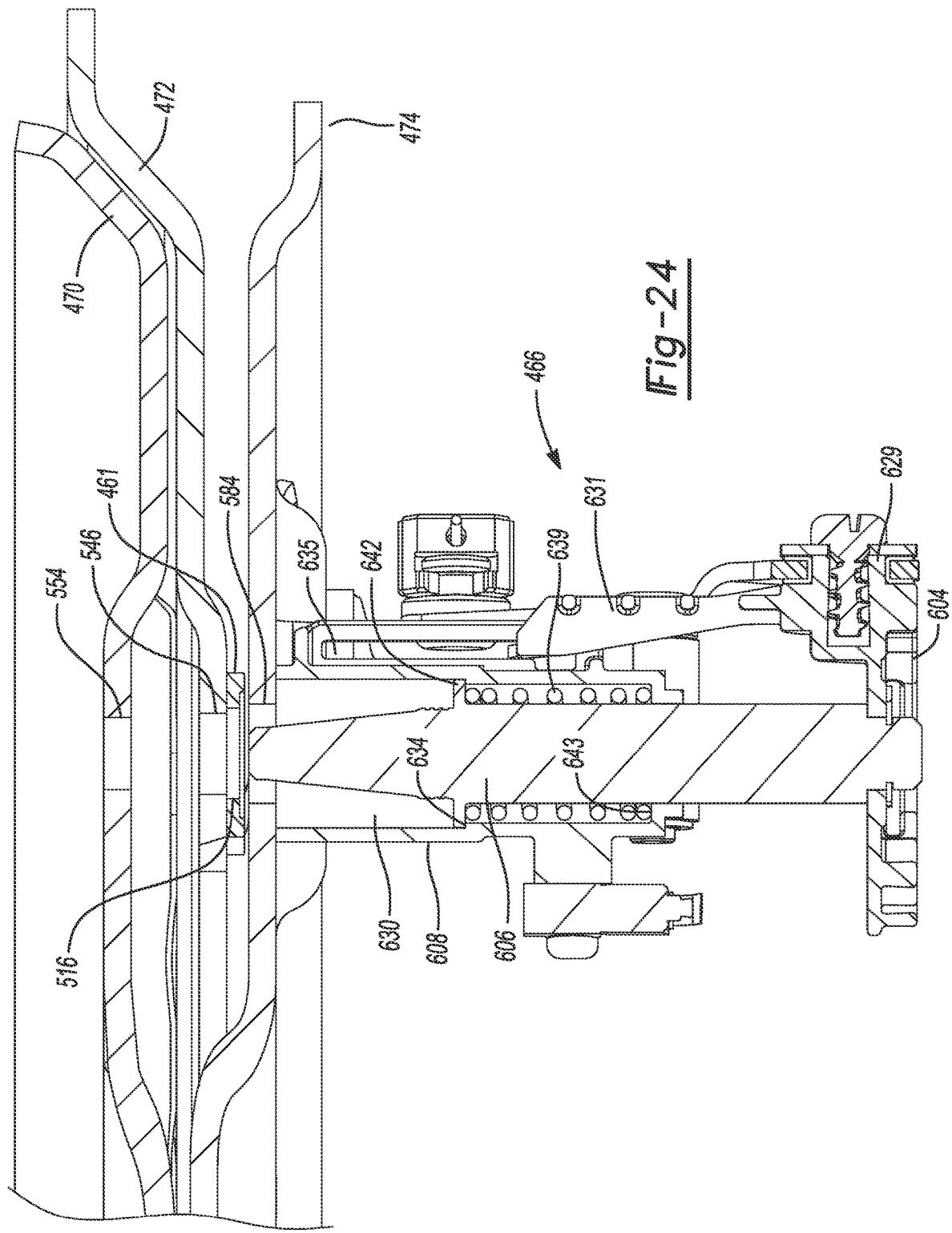
FIG. 24 is a partial cross-sectional view of the swivel assembly with the locking pin assembly in the unlocked position.
Figure 25:
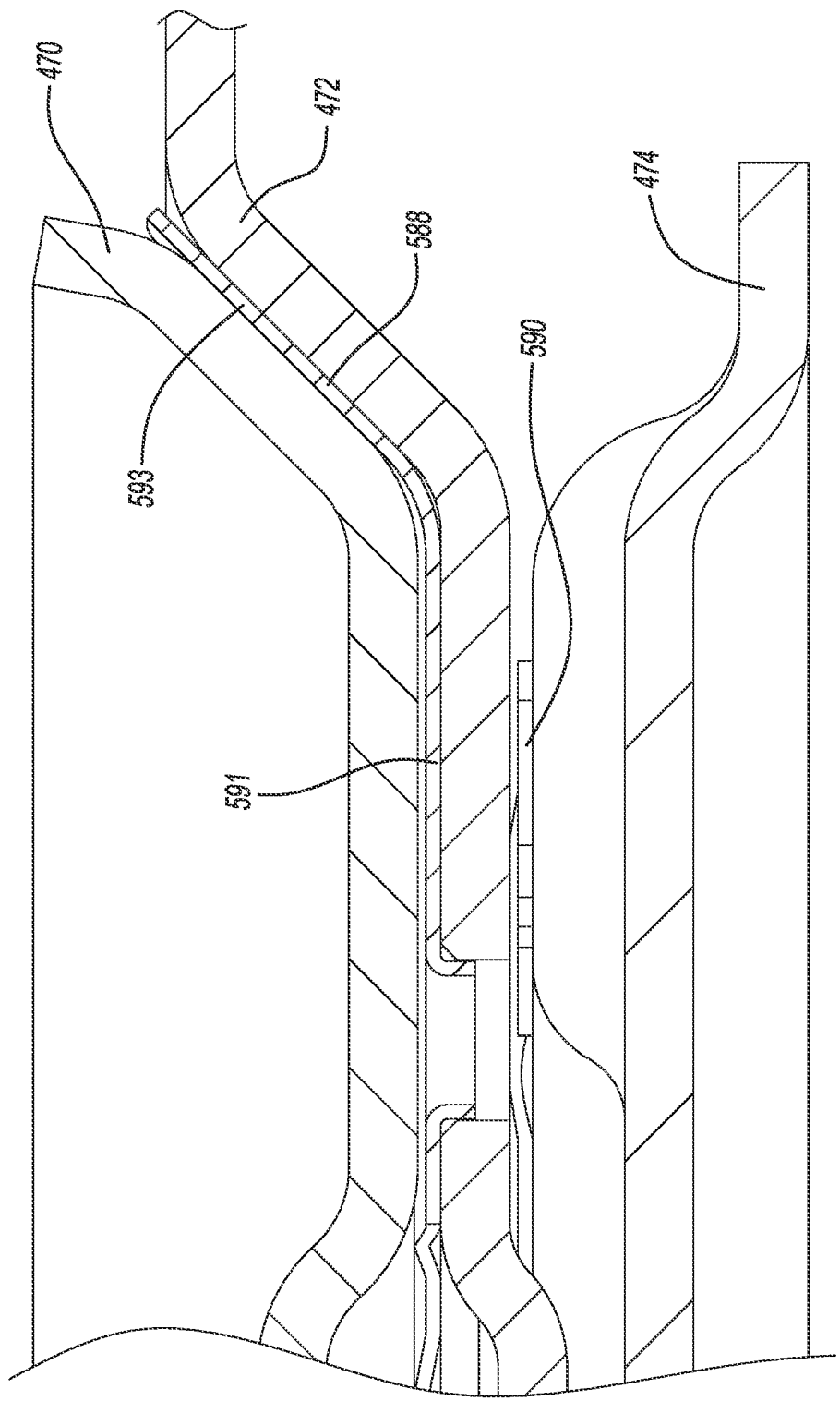
FIG. 25 is another partial cross-sectional view of swivel assembly.
Figure 26:
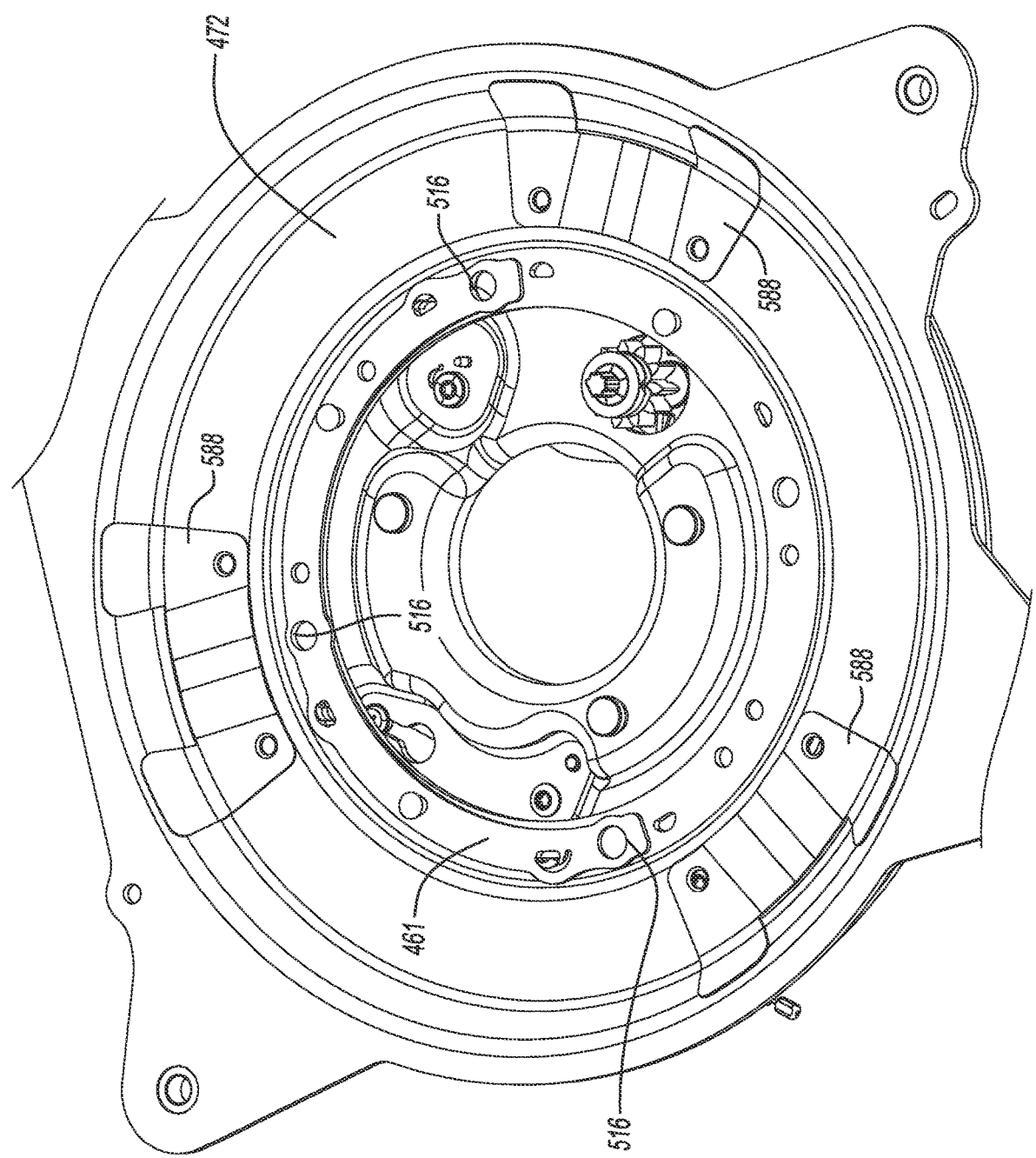
FIG. 26 is a partial perspective view of the swivel assembly with an upper plate and gear ring removed.

Referring now to FIGS. 20-24, the locking pin assembly 466 is movable between a locked position (FIGS. 20 and 23) and an unlocked position (FIGS. 121 and 24). When the locking pin assembly 466 is in the locked position, the locking pin assembly 466 engages the rotating plate 472 and the upper plate 470 to restrict rotation of the rotating plate 472 relative to the lower plate 474 (i.e., to prevent the seat assembly 52 from rotating relative to the vehicle floor 57). When the locking pin assembly 466 is in the unlocked position, the locking pin assembly 466 disengages the upper plate 470 and the rotating plate 472 to allow rotation of the rotating plate 472 relative to the lower plate 474 (i.e., to allow the seat assembly 52 to rotate relative to the vehicle floor 57).

The locking pin assembly 466 may include an actuator 596 (e.g., a solenoid, a linear motor, or other electromechanical actuator), a plunger 598, a cable or rod 600, a connecting link 602, a connecting bracket 604, a locking pin 606, and a locking pin housing 608. The actuator 596 may be fixedly attached to the lower plate 474. The plunger 598 may be reciprocatingly received in a housing 597 of the actuator 596. An end 612 of the plunger 198 may be attached to the cable 600. Actuation of the actuator 596 may cause the plunger 598 to move linearly relative to the actuator housing 597 (i.e., such that the end 612 of the plunger 598 moves toward the actuator housing 597) from the position shown in FIG. 20 (corresponding to the locked position) to the position shown in FIG. 21 (corresponding to the unlocked position).

Figure 20:
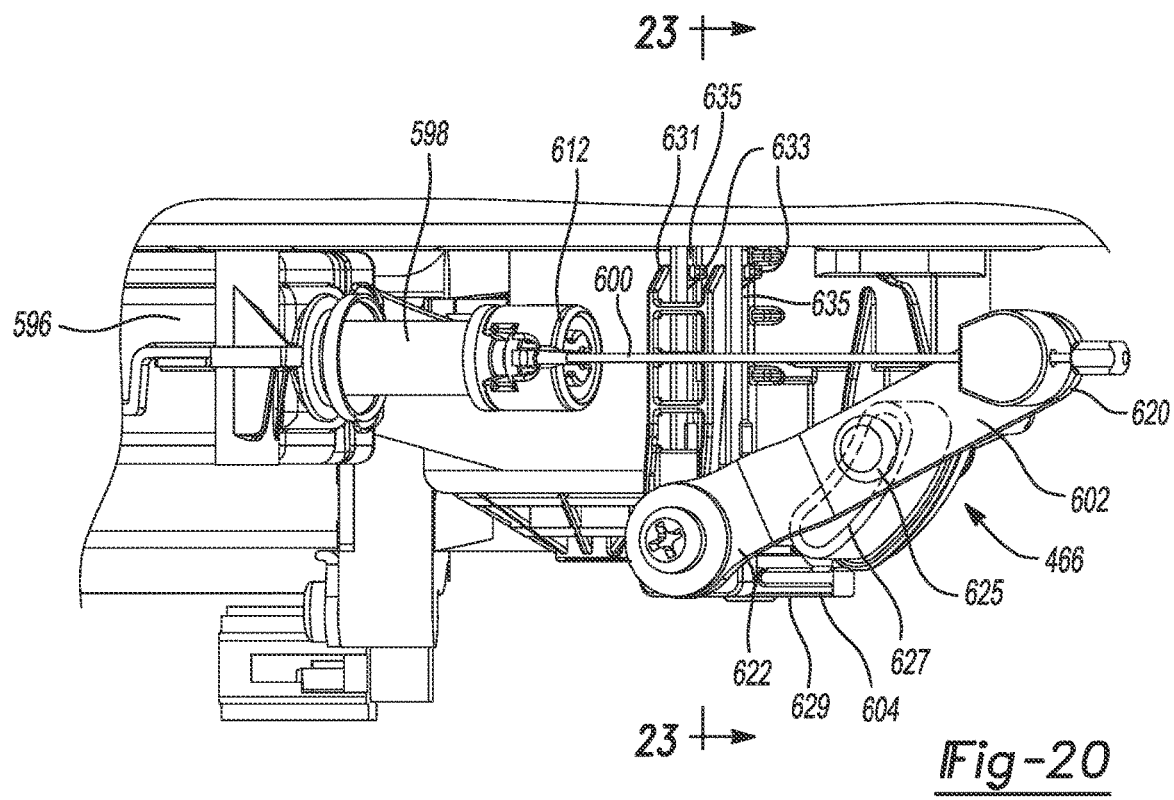
FIG. 20 is a partial perspective view of a locking pin assembly of the swivel assembly of FIG. 19, where the locking pin assembly is in a locked position.
Figure 21:
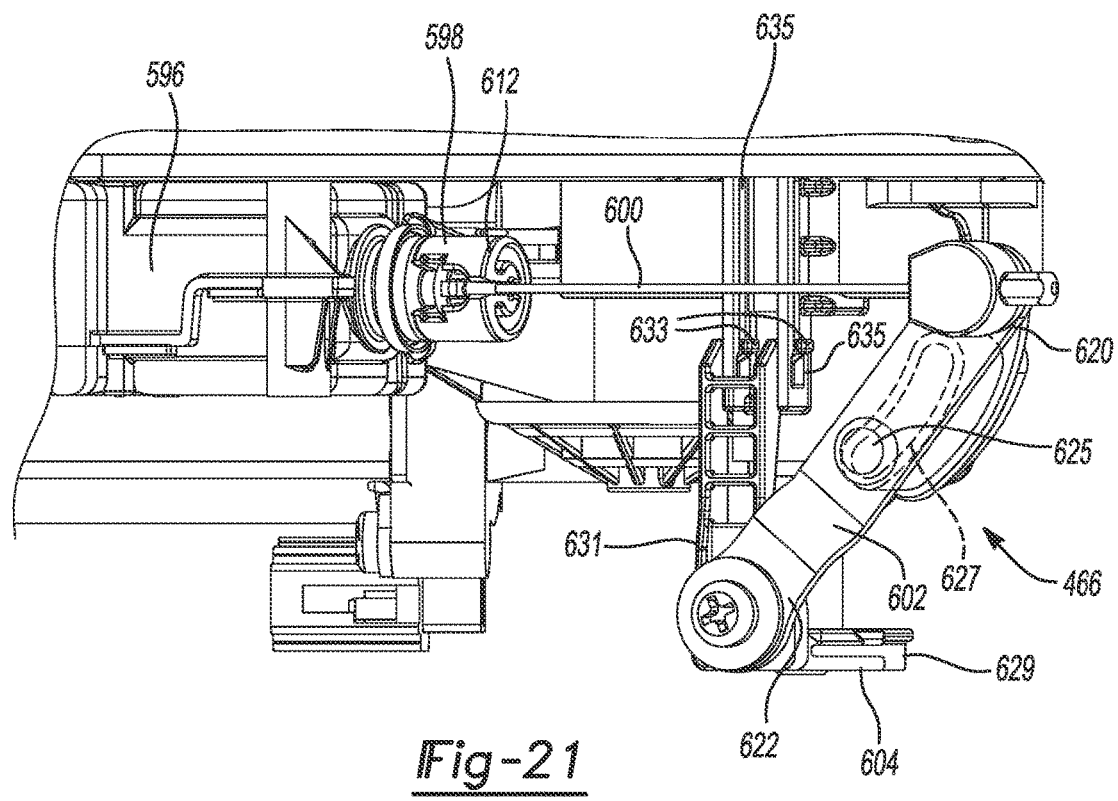
FIG. 21 is a partial perspective view of the locking pin assembly in an unlocked position.

One end of the cable 600 may be attached to the end 612 of the plunger 598 and another end of the cable 600 may be pivotably attached to a first end 620 of the connecting link 602. The connecting bracket 604 may be pivotably attached to a second end 622 of the connecting link 602. The connecting bracket 604 may be fixedly attached to the locking pin 606 (e.g., by a clip, fastener, and/or any other suitable means). An intermediate portion 621 of the connecting link 602 may include a protrusion or pin 625. The pin 625 may be slidably received in a curved slot 627 formed in the locking pin housing 608. As shown in FIGS. 20 and 21, the pin 625 slides along the curved slot 627 as the locking pin assembly 466 moves between the locked and unlocked positions.

The connecting bracket 604 may be generally L-shaped. That is, the connecting bracket a first leg 629 and a second leg 631 that are angled relative to each other. The first leg 629 engages an end of the locking pin 606. The second leg 631 slidably engages the locking pin housing 608. That is, the second leg 631 may include one or more pegs 633 that are slidably received in one or more slots 635 in the locking pin housing 608. The pegs 633 slide along the slots 635 as the locking pin assembly 466 moves between the locked and unlocked positions. The slidable engagement between the pin 625 and slot 627 and the slidable engagement between the pegs 633 and slots 635 increase the stability and rigidity of the locking pin assembly 466.

As shown in FIG. 22, the locking pin housing 608 may include a cylindrical tube 630 and a pair of arms 632 extending transversely from the cylindrical tube 230. The arms 632 may be fixedly attached to the lower plate 474 (e.g., via fasteners). A locking pin seat 634 (FIGS. 23 and 24) may be disposed within the cylindrical tube 630 between the first and second axial ends of the tube 630.

As shown in FIGS. 23 and 24, the locking pin 606 and a spring 639 may be disposed within the cylindrical tube 630 of the locking pin housing 608. The locking pin 606 may include a flange 642 that extends radially outward and is positioned between first and second axial ends of the locking pin 606. The spring 639 may extend helically about the locking pin 606 and may be positioned between the flange 642 and an axial end wall 643 of the locking pin housing 608. The spring 639 biases the locking pin 606 toward the locked position (FIG. 23).

The locking pin 606 and the locking pin housing 608 may be positioned substantially perpendicular to the upper plate 470, rotating plate 472, and lower plate 474. In the locked position (FIG. 23), the locking pin 606 may extend through (or at least partially into) an aperture 584 of the lower plate 474, an aperture 546 of the rotating plate 472, and an aperture 554 of the upper plate 470. In some embodiments, the locking pin 606 may also extend through (or partially into) an aperture 516 of a guide ring 461 when the locking pin 606 is in the locked position. The guide ring 461 may be fixed relative to the rotating plate 472. In some rotation positions of the seat assembly 52, the locking pin 606 may also engage an aperture or slot of the gear ring 462 when in the locked position.

In the unlocked position, the locking pin 606 is retracted out of the apertures 554, 546, 516 to disengage the locking pin 606 from the guide ring 461, rotating plate 472, and upper plate 470 to allow rotation of the seat assembly 52 relative to the vehicle floor 57.

The guide ring 461 can be designed to include a desired number of apertures 516 at desired locking positions to suit a given application. For example, if the vehicle manufacturer desires the swivel assembly 456 to lock a 0-degree, 90-degree, and 180-degree positions, the guide ring 461 may include only three apertures 516 positioned at the 0-degree, 90-degree, and 180-degree positions, while the rotating plate 472 and upper plate 470 may include additional apertures 546, 554 to suit a wider variety of applications that may call for a different number of locking positions and/or locking positions at different locations. In this manner, only the guide ring 461 needs to made according to any specific application and the plates 472, 470 can be generic to all applications.

The term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), a controller area network (CAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A swivel assembly for moving a vehicle seat in an angular direction relative to a vehicle floor between a first angular position and a second angular position, the swivel assembly comprising:
    a lower plate configured to be attached to the vehicle floor;
    a rotating plate configured to be attached to the vehicle seat;
    a gear ring fixedly attached to the rotating plate;
    a motor coupled to the gear ring, wherein the motor drives the gear ring to move in the angular direction to cause corresponding movement of the rotating plate and the vehicle seat; and
    a locking pin assembly including a locking pin movable relative to the lower plate between an unlocked position and a locked position,
    wherein in the locked position, the locking pin engages the rotating plate to restrict rotation of the rotating plate, and
    wherein in the unlocked position, the locking pin disengages the rotating plate to allow rotation of the rotating plate,
    wherein the locking pin assembly includes an actuator that drives movement of the locking pin between the locked and unlocked positions,
    wherein the locking pin assembly includes:
        a plunger movably received within a housing of the actuator, and
        a connecting link that transmits movement of the plunger to the locking pin,
    wherein the plunger translates into and out of the housing of the actuator, and movement of the plunger causes pivoting movement of the connecting link such that the locking pin is moved between the locked position and unlocked position,
    wherein the locking pin assembly includes a locking pin housing that reciprocatingly receives the locking pin, wherein the locking pin housing includes a curved slot that slidably receives a protrusion extending from the connecting link, wherein the locking pin assembly includes a connecting bracket that is attached to the locking pin and slidably engages the locking pin housing, and wherein the connecting bracket is pivotably attached to the connecting link.

2. The swivel assembly of claim 1, further comprising a gear coupled to the motor and meshingly engaged with the gear ring.

3. The swivel assembly of claim 2, wherein the gear includes outer teeth, and wherein the gear ring includes inner teeth that mesh with the outer teeth.

4. The swivel assembly of claim 3, wherein the motor drives rotational movement of the gear, and movement of the gear causes corresponding and simultaneous rotation of the gear ring.

5. The swivel assembly of claim 1, wherein the gear ring is positioned vertically above the rotating plate.

6. A swivel assembly for moving a vehicle seat in an angular direction relative to a vehicle floor between a first angular position and a second angular position, the swivel assembly comprising:
    a lower plate configured to be attached to the vehicle floor;
    a rotating plate configured to be attached to the vehicle seat;
    a gear ring fixedly attached to the rotating plate;
    a motor coupled to the gear ring, wherein the motor drives the gear ring to move in the angular direction to cause corresponding movement of the rotating plate and the vehicle seat; and
    a locking pin assembly including a locking pin movable relative to the lower plate between an unlocked position and a locked position,
    wherein in the locked position, the locking pin engages the rotating plate to restrict rotation of the rotating plate, and
    wherein in the unlocked position, the locking pin disengages the rotating plate to allow rotation of the rotating plate,
    wherein the gear ring is positioned vertically above the rotating plate, and
    wherein the locking pin extends through the lower plate and at least partially through the rotating plate and the gear ring in the locked position,
    wherein the locking pin assembly includes an actuator that drives movement of the locking pin between the locked and unlocked positions,
    wherein the locking pin assembly includes:
        a plunger movably received within a housing of the actuator, and
        a connecting link that transmits movement of the plunger to the locking pin,
    wherein the locking pin assembly includes a locking pin housing that reciprocatingly receives the locking pin, wherein the locking pin housing includes a curved slot that slidably receives a protrusion extending from the connecting link, wherein the locking pin assembly includes a connecting bracket that is attached to the locking pin and slidably engages the locking pin housing, and wherein the connecting bracket is pivotably attached to the connecting link.

7. The swivel assembly of claim 6, wherein the plunger translates into and out of the housing of the actuator, and movement of the plunger causes pivoting movement of the connecting link such that the locking pin is moved between the locked position and unlocked position.

8. The swivel assembly of claim 6, further comprising a gear coupled to the motor and meshingly engaged with the gear ring.

9. The swivel assembly of claim 8, wherein the gear includes outer teeth, and wherein the gear ring includes inner teeth that mesh with the outer teeth.

10. The swivel assembly of claim 9, wherein the motor drives rotational movement of the gear, and movement of the gear causes corresponding and simultaneous rotation of the gear ring.

11. The swivel assembly of claim 6, wherein the gear ring includes a plurality of slots spaced angularly apart from each other.

12. The swivel assembly of claim 11, wherein the locking pin moves into one of the slots of the gear ring to restrict movement of the rotating plate and the locking pin moves out of the slots to allow movement of the rotating plate.

* * * * *